US010982705B2

United States Patent
Khosravani

(10) Patent No.: US 10,982,705 B2
(45) Date of Patent: Apr. 20, 2021

(54) METHOD, APPARATUS AND APPLICATOR FOR APPLYING A COATING ON A SURFACE OF A LAMINATION

(71) Applicant: The Boeing Company, Chicago, IL (US)

(72) Inventor: Shahriar Khosravani, Everett, WA (US)

(73) Assignee: The Boeing Company, Chicago, IL (US)

(*) Notice: Subject to any disclaimer, the term of this patent is extended or adjusted under 35 U.S.C. 154(b) by 269 days.

(21) Appl. No.: 15/923,630

(22) Filed: Mar. 16, 2018

(65) Prior Publication Data

US 2019/0285109 A1    Sep. 19, 2019

(51) Int. Cl.
| | | |
|---|---|---|
| *F16B 39/02* | (2006.01) | |
| *C23C 10/30* | (2006.01) | |
| *B22F 7/06* | (2006.01) | |
| *C23C 28/02* | (2006.01) | |
| *B29C 65/00* | (2006.01) | |
| *C23C 24/02* | (2006.01) | |

(52) U.S. Cl.
CPC .............. *F16B 39/026* (2013.01); *B22F 7/06* (2013.01); *B29C 65/00* (2013.01); *B29C 66/70* (2013.01); *C23C 10/30* (2013.01); *C23C 24/02* (2013.01); *C23C 28/02* (2013.01)

(58) Field of Classification Search
CPC ........................................................ B22F 9/04
See application file for complete search history.

(56) References Cited

U.S. PATENT DOCUMENTS

| | | |
|---|---|---|
| 4,741,918 A | 5/1988 | Nagy de Nagybaczon et al. |
| 4,755,904 A | 7/1988 | Brick |
| 5,729,531 A | 3/1998 | Raith et al. |
| 6,186,792 B1 | 2/2001 | Discko |
| 7,887,268 B2 | 2/2011 | Mathis |
| 2010/0014048 A1 | 1/2010 | Kousaka |
| 2011/0062287 A1 | 3/2011 | Metzech et al. |
| 2013/0099490 A1 | 4/2013 | Kwon et al. |
| 2016/0196891 A1 | 7/2016 | Le et al. |

(Continued)

FOREIGN PATENT DOCUMENTS

| | | |
|---|---|---|
| GB | 414038 A | 7/1934 |
| GB | 2061183 A | 5/1981 |

OTHER PUBLICATIONS

European Examination Report dated Mar. 17, 2020 in European Patent Application No. 19159632.9 (European counterpart of the instant patent application).

(Continued)

*Primary Examiner* — Ian A Rummel
(74) *Attorney, Agent, or Firm* — Ostrager Chong Flaherty & Broitman P.C.

(57) ABSTRACT

A method for applying a coating on a surface of a lamination of plies of fiber-reinforced plastic material. The surface of the lamination includes exposed ends of reinforcement fibers. The method includes selecting an electrically conductive material that is abradable in a solid state by rubbing against the surface of the lamination having exposed ends of reinforcement fibers, and rubbing the electrically conductive material against the surface of the lamination to cause particles of electrically conductive material to be abraded and deposited on the surface of the lamination.

21 Claims, 21 Drawing Sheets

(56) References Cited

U.S. PATENT DOCUMENTS

2016/0229552 A1   8/2016   Gross et al.

OTHER PUBLICATIONS

Partial European Search Report with Provisional Opinion dated Sep. 3, 2019 in European Patent Application No. 19159632.9 (European counterpart of the instant patent application).
Supplementary European Search Report dated Mar. 3, 2020 in European Patent Application No. 19159632.9 (European counterpart of the instant patent application).

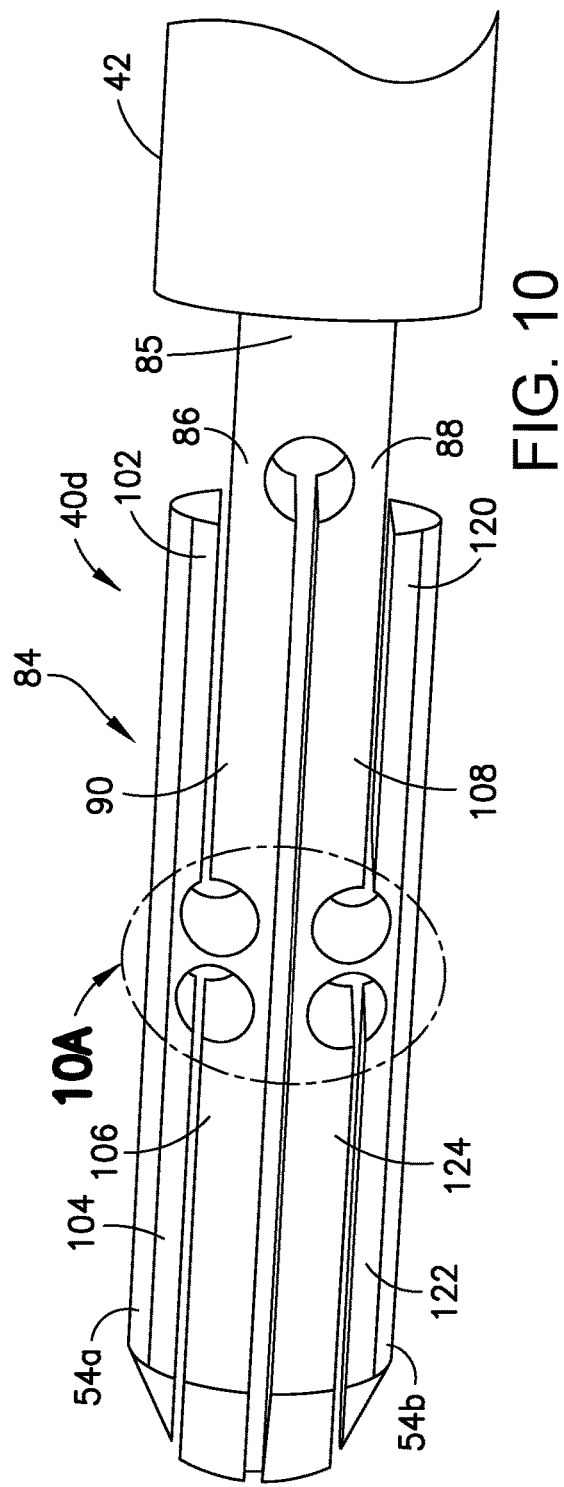
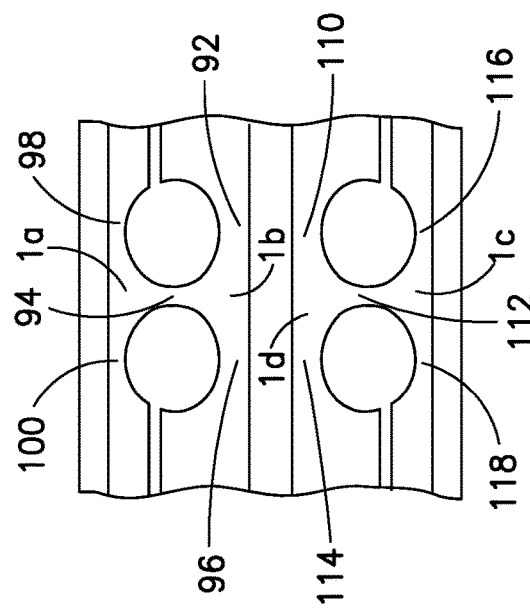
FIG. 10
FIG. 10A

METHOD, APPARATUS AND APPLICATOR FOR APPLYING A COATING ON A SURFACE OF A LAMINATION

BACKGROUND

This disclosure generally relates to the use of fasteners to secure two or more structures or workpieces (at least one of which is made of composite material, such as fiber-reinforced plastic) in a manner such that interference fit of the fasteners within joint holes (hereinafter "holes") in the structure may be achieved. In particular, this disclosure relates to apparatus and methods for fastening a layer of composite material to another layer of material using an interference fit fastener assembly having a bolt or a pin and a mating part (e.g., a nut or a collar).

As used herein, the category "mating parts" comprises internally threaded nuts and collars and swaged collars. As used herein, the category "fasteners" includes bolts, pins, rivets, and/or any other suitable device. As used herein, the term "external projections" should be construed broadly to encompass at least the following types: (1) external threads and (2) external annular rings. As used herein, the term "hole" means a surface that bounds a space and connects openings in opposing surfaces of a part. In the context of fiber-reinforced plastic material, the surface bounding the space is formed by resin and fibers.

At least one method for fastening multiple layers of material together is to clamp up the layers, drill holes, and then insert fasteners into the holes to secure the layers together. The fasteners are usually inserted in a net or clearance fit in the receiving holes in the layers. For many applications, this will be sufficient. However, when the assembled structure is subjected to cyclic loading, the looseness of the fit of the fasteners within their holes can result in continual working of the fasteners within their holes.

Additional challenges are presented when one or more of the fastened layers are made of composite material. For example, carbon fiber-reinforced plastic (CFRP) is considerably less conductive than metal. Electrical current is conducted through carbon fibers in the CFRP structure. Any discontinuity between the carbon fibers and the metallic fastener in the CFRP hole is undesirable.

An interference fit of the fastener (hereinafter "interference fit fastener") in the hole may effectively reduce discontinuities due to cyclic loading of the assembled structure. Interference creates a tighter joint that reduces movement, resulting in enhanced fatigue performance. Additionally, interference fit fasteners may help dissipate electrical current.

One method for minimizing the variation in interference fit for sleeveless fasteners used to fasten a layer of composite material (hereinafter "composite layer") to another layer of material (e.g., a metallic layer or another composite layer), while enhancing the electrical conductivity between the fibers of the composite material (e.g., CFRP) and the metallic fastener, involves coating the hole with molten low-melting alloy. However, the molten low-melting alloy tends to be repelled by the fibrous CFRP surface due to the high surface tension of the molten low-melting alloy. This can be due to extreme curvatures at the fiber level dimension. The surface tension of the low-melting alloy can inhibit spreading at this scale.

SUMMARY

Although various embodiments of methods, apparatus and applicators for coating joint holes in a composite layer by abrasion of solid electrically conductive material will be described in some detail below, one or more of those embodiments may be characterized by one or more of the following aspects.

One aspect of the subject matter disclosed in detail below is a method for applying a coating on a surface of a lamination of plies of fiber-reinforced plastic material, which surface has exposed ends of reinforcement fibers, the method comprising: selecting an electrically conductive material that is abradable in a solid state by rubbing against the surface of the lamination having exposed ends of reinforcement fibers; and rubbing the electrically conductive material against the surface of the lamination to cause particles of electrically conductive material to be abraded and deposited on the surface of the lamination. In accordance with some embodiments, the surface of the lamination is a hole that extends through multiple plies. In accordance with other embodiments, the surface of the lamination is an edge that has been cut through multiple plies. Preferably the solid electrically conductive material is a low-melting alloy (LMA), which is also commonly referred to as a "fusible alloy". As used herein, the term "low-melting alloy" refers to alloys having a melting temperature in a range greater than 170° F. and less than 300° F.

Another aspect of the subject matter disclosed in detail below is an apparatus comprising: a support structure; bearings supported by the support structure; a spindle rotatably supported by the bearings; a motor mechanically coupled to the spindle for driving rotation of the spindle; a chuck coupled to the spindle; and a hole coating applicator comprising a shaft made of a material that is not LMA and clamped by the chuck, and a LMA pad that is supported by the shaft and radially movable relative to the shaft. In accordance with some embodiments, the hole coating applicator further comprises a flexural element that is configured to bend relative to the shaft due to flexure of a flexural hinge, and the LMA pad is attached to the flexural element. In accordance with other embodiments, the hole coating applicator further comprises: a camming surface; a camming block that carries the LMA pad and has an inclined surface in contact with the camming surface; and a spring that exerts an axial spring force on the camming block, wherein the camming surface deflects the camming block to move radially outward when the axial spring force is exerted on the camming block.

A further aspect of the subject matter disclosed in detail below is a hole coating applicator comprising: a shaft made of a metal alloy that is not a LMA and having a distal end; an applicator body made of a metal alloy that is not a LMA, the applicator body comprising a non-flexural portion that is fixedly coupled to a portion of the shaft located at a distance from the distal end of the shaft and a flexural element that is configured to bend relative to the non-flexural portion due to flexure of a flexural hinge; and a pad made of abradable material (e.g., LMA) attached to the flexural element.

Yet another aspect of the subject matter disclosed in detail below is a hole coating applicator comprising: a shaft made of a material that is not a LMA; an applicator body coupled to the shaft, made of a material that is not a LMA and comprising a camming surface; a camming block made of a material that is not a LMA and having an inclined surface that confronts the camming surface; a LMA pad attached to the camming block, the LMA pad having an outer peripheral surface that is exposed; and a spring that exerts an axial spring force on the camming block, wherein the camming surface deflects the camming block to move in a direction having a radially outward component when the camming block is moved by the axial spring force.

A further aspect is a structural assembly comprising: a composite layer having a hole or edge with a surface that has concavities; and a coating adhered to the surface of the hole or edge and filling the concavities, wherein the composite layer comprises fibers made of electrically conductive material and the coating comprises an aggregation of abraded particles of LMA deposited in a cold state. In accordance with some embodiments, the coating further comprises a continuous thin film of LMA overlying the aggregation of particles. Suitable LMAs include alloys of two or more elements of the following: bismuth, indium, tin, lead, and antimony. A preferred LMA is a ternary alloy consisting of a mixture of bismuth (preferably more than 50%), indium and tin.

Other aspects of systems, apparatus and methods for coating joint holes in a composite layer by abrasion of solid electrically conductive material are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 9 and 10 are diagrams representing different views of a hole coating applicator in accordance with a fourth embodiment.

FIG. 10A is a diagram representing a magnified view of the portion of the hole coating applicator within the dashed ellipse 10A indicated in FIG. 10.

Reference will hereinafter be made to the drawings in which similar elements in different drawings bear the same reference numerals.

DETAILED DESCRIPTION

Figure 1:
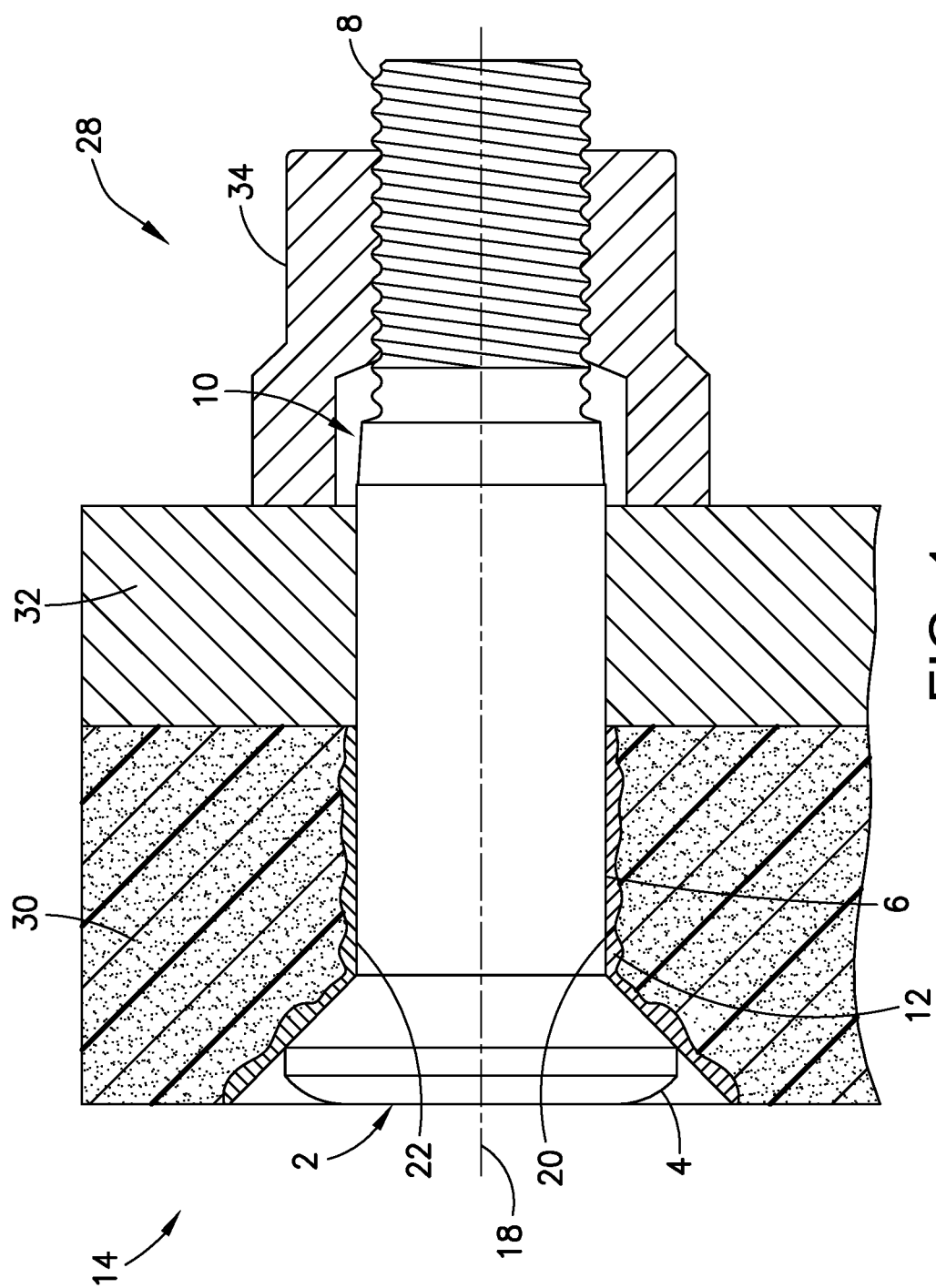
FIG. 1 is a diagram representing a partially sectioned view of an assembly including composite and metallic structures gripped by a sleeveless interference fit fastener assembly.

The subject matter disclosed in some detail below is directed to methods, apparatus and applicators for coating joint holes in a composite layer by abrading solid electrically conductive material, such as low-melting alloy (LMA). Low-melting alloy has low hardness due to its lower intermolecular strength and can be delivered to the joint hole in the composite material directly at room temperature. After a metallic fastener has been inserted in the coated hole, the coating can enhance the electrical conductivity between the fibers of the composite material (e.g., CFRP) and the metallic fastener, while minimizing the variation in interference fit for sleeveless fasteners used to fasten a layer of composite material (hereinafter "composite layer") to another layer of material (e.g., a metallic layer or another composite layer). The solid electrically conductive material can be deposited on edges as well.

More particularly, the coating technique proposed herein can circumvent the difficulties attributable to the molecular repulsive force produced when molten LMA wets a rough surface of a CFRP layer. In accordance with some embodiments, the size of LMA particulates on the surface is reduced by applying the LMA cold (e.g., at room temperature) and depositing a thin layer of LMA through abrasion (similar to a chalk-on-board effect). This primary layer of LMA can reduce the effective curvature of the coated hole formed by the LMA and produces a repeatable and consistent coating over the CFRP surface. The proposed method can produce a distinct microstructure of LMA on CFRP that significantly improves the LMA/CFRP interface quality and connectivity. The method may also significantly improve the LMA coating quality and quantity when applied to a titanium fastener.

Optionally, a second deposit of LMA in a molten state can be applied. In that event, the molten LMA easily spreads on the primary layer of LMA to create a closer-to-perfect final coating.

The apparatus used to practice the above-described method includes a rotating applicator configured to coat a joint hole by depositing a solid electrically conductive material (e.g., LMA) through friction. The hole coating applicator includes a shaft which can be gripped by a chuck mounted on the end of a spindle of a stationary drilling machine or a drilling tool attached to a robot or other automated apparatus.

In accordance with some embodiments, the hole coating applicator further includes one or more camming blocks that carry respective pads made of LMA (hereinafter "LMA pads") configured to rub against a hole and a spring that exerts an axial spring force on the camming blocks. The hole coating applicator further includes respective camming surfaces that cause the camming blocks to move radially outward when the axial spring force is exerted on the camming blocks in an axial direction. During rotation of the hole coating applicator, the LMA is pressed against the hole with sufficient force to abrade LMA particles and deposit the LMA particles on the CFRP that forms the joint hole until a desired coating thickness is achieved.

In accordance with other embodiments, the hole coating applicator further includes flexural elements that have the capability to bend relative to the shaft at respective flexural hinges, and respective LMA pads attached to the flexural elements. Each LMA pad has an outer peripheral surface that is disposed radially outward further from the shaft than any portion of the hole coating applicator not made of LMA. During rotation of the hole coating applicator, the flexural elements press the LMA against the hole with sufficient force to abrade LMA particles and deposit them on the CFRP until a desired coating thickness is achieved.

As used herein, the term "bend", in the context of a flexural element connected to another element by way of a flexural hinge, means to change the angle of the flexural element relative to the other element due to flexure of the flexural hinge, not to bend along the length of the flexural element. If a flexural element is connected to another element by way of multiple flexural hinges, then the flexural element is configured to bend relative to the other element due to flexure at one or more of the multiplicity of flexural hinges.

To ensure that a sufficient amount of LMA is applied in a particular composite joint installation, a real-time monitoring system can be employed to verify that the contact resistance is within an acceptable range. If the capacitive coupling described herein is utilized, the effective resistance depends only on the hole interface resistance (i.e., the effective resistance is LMA quality/quantity dependent). The circuits described herein include a capacitive coupling segment that allows the monitoring system to measure resistance with one contact point only. A feedback loop is used to control the LMA application process (applicator insertion and rotation) and confirm completion to a satisfactory resistance level based on the response by the monitoring system. By depositing LMA to form a coating on the joint hole, concurrently measuring the effective resistance of the LMA and carbon fibers in series, and then ceasing deposition when a specified effective resistance is achieved, at least a minimum acceptable electrical conductivity at the hole/fastener interface can be achieved in the final structural assembly.

Various embodiments of systems, apparatus, and methods for coating joint holes in a composite layer by abrasion of solid electrically conductive material will now be described in detail for the purpose of illustration. The resulting coating can minimize interference fit variation and can enhance electrical conductivity in an interference fit fastener assembly. At least some of the details disclosed below relate to optional features or aspects, which in some applications may be omitted without departing from the scope of the claims appended hereto.

One illustrative embodiment of a structural assembly including a first structural element made of metallic material (e.g., a metal alloy) attached to a second structural element made of composite material (e.g., fiber-reinforced plastic) by means of a sleeveless interference fit fastener assembly will now be described in detail with reference to FIG. 1. In accordance with that example, the fastener includes a pin, and the mating part includes a swaged collar that is interengaged with the external projections of the mating portion of the pin. However, the concepts disclosed herein also have application in other embodiments in which the fastener includes a bolt, and the mating part includes a nut having internal threads that are interengaged with the external projections of the mating portion of the bolt.

FIG. 1 is a diagram representing a partially sectioned view of a structural assembly 14 including a composite layer 30 having a hole 20 with a surface that has crevices. The structural assembly 14 also includes a coating 12 adhered to the hole 20 and filling the crevices. The coating 12 defines a circular cylindrical coated hole 22. The composite layer 30 has fibers made of electrically conductive material, and the coating 12 includes or is a LMA, which was applied while in a molten state. In the example depicted in FIG. 1, the structural assembly 14 further includes a metallic layer 32 disposed adjacent to and in contact with the composite layer 30.

The structural assembly 14 can also include a sleeveless interference fit fastener assembly 28 having a fastener 2 and a swaged collar 34. The fastener 2 includes a shank 6, a threaded portion 8, and a transition portion 10. In alternative embodiments, the fastener 2 may have external annular rings instead of external threads. Although FIG. 1 depicts a fastener 2 having a countersunk (i.e., flush) head 4, the fastener 2 may in the alternative have a protruding head. An interference fit is achieved by the coated hole 22 having an inner diameter that is less than the outer diameter of the shank 6 (e.g., a difference of a few thousandths of an inch).

The fastener 2 shown in FIG. 1 is inserted into the coated hole 22 and the unswaged collar (not shown in FIG. 1) is placed over a portion of the fastener 2. During the installation cycle of the fastener 2, the unswaged collar (in the form of a loose-fitting metal ring) is deformed around the fastener 2, which has locking grooves on the threaded portion 8, to form swaged collar 34. The fastener 2 and swaged collar 34 combine to form the fastener assembly 28. The bolts and pins are preferably made of a metal alloy such as titanium alloy, aluminum alloy, Inconel, or corrosion-resistant steel. The collars are preferably made of titanium alloy, aluminum alloy, or corrosion-resistant steel.

This disclosure proposes to improve the quality and connectivity of the coating/composite layer interface inside a joint hole (e.g., a joint hole of the type depicted in FIG. 1) by applying solid LMA that has a low abrasion resistance, rather than by applying molten LMA, to the surface of the composite material that forms the hole 20. Optionally, molten LMA can be applied over the solid LMA deposited in the hole to achieve a coated hole having a surface that is smoother than what can be achieved using solid LMA alone.

The process briefly described in the preceding paragraph may be applied to every joint hole in a composite layer to be included in a stack of layers to form a structural assembly 14, such as a structural part (e.g., of an aircraft). After all holes in all layers of composite material to be included in the structural assembly 14 have been coated with LMA, the layers of composite material and any other layers not made of composite material are placed in a stack such that the holes in the respective stacked layers are aligned. A respective fastener 2 is pre-heated (to liquefy the surface of the solidified material to enable hydroplaning during insertion, thereby reducing resistance) and then inserted into the coated hole 22 in the composite layer 30 with an interference fit. The swaged collar 34 is then coupled to the respective fastener 2. In each instance, at least a portion of the shank 6 of the fastener 2 is surrounded by the coating 12 made of electrically conductive material.

Figure 2:
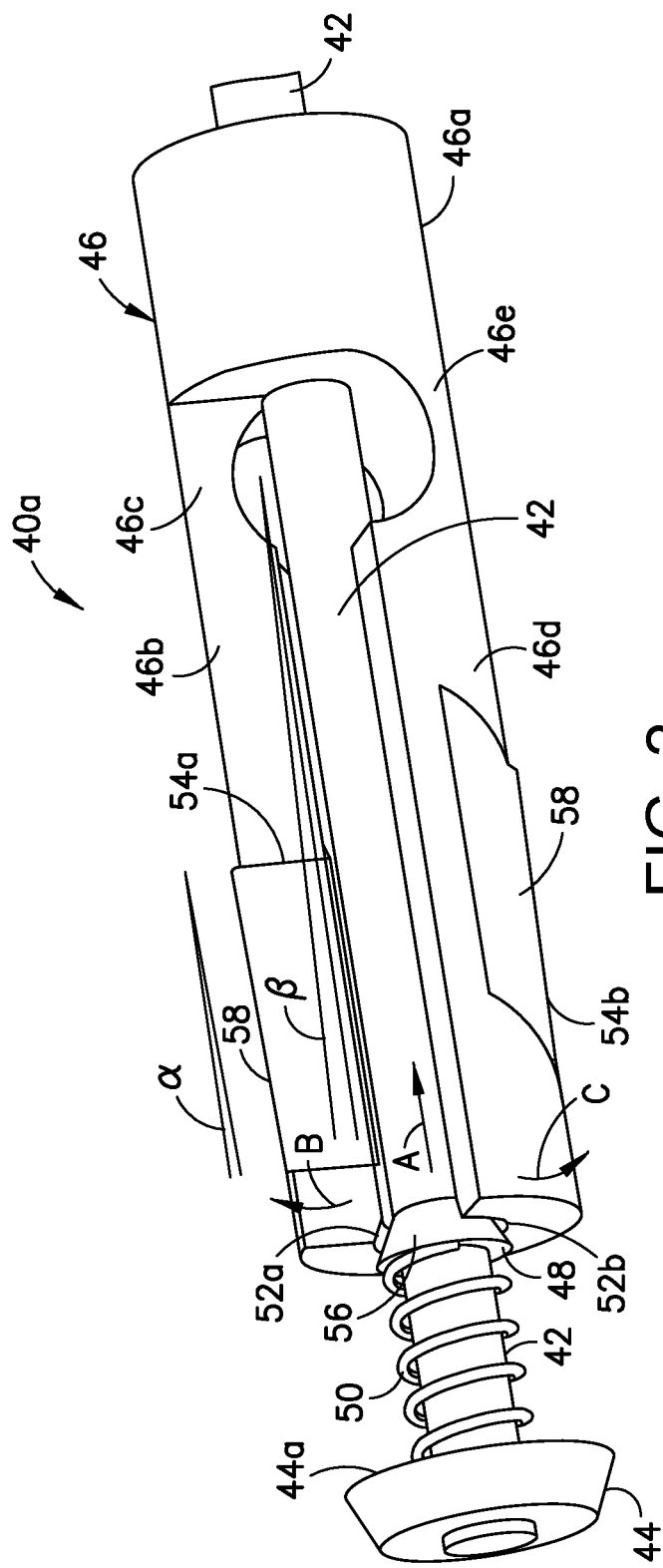
FIG. 2 is a cutaway diagram representing a view of portions of a hole coating applicator in accordance with a first embodiment.
Figure 3:
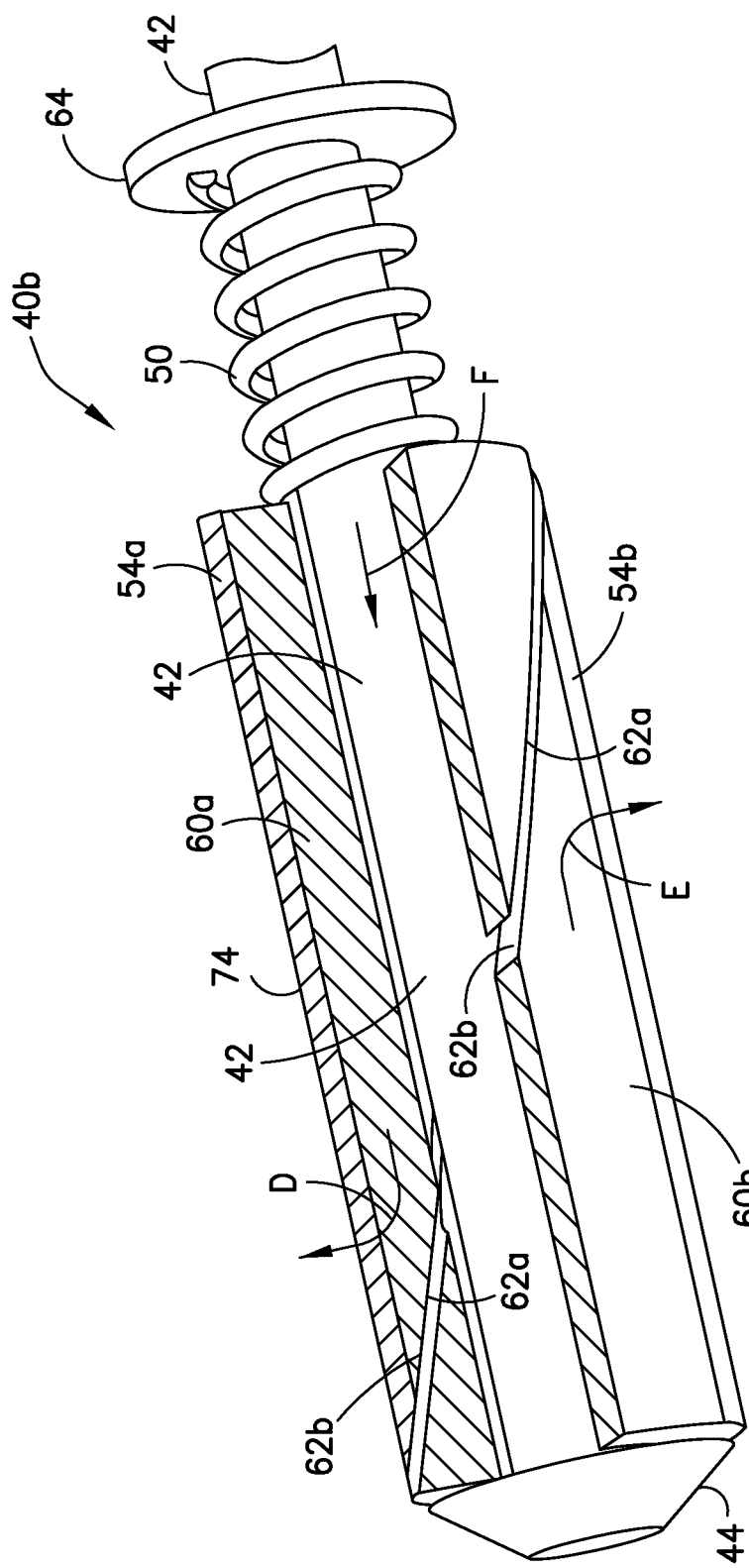
FIG. 3 is a cutaway diagram representing a view of portions of a hole coating applicator in accordance with a second embodiment.
Figure 4:
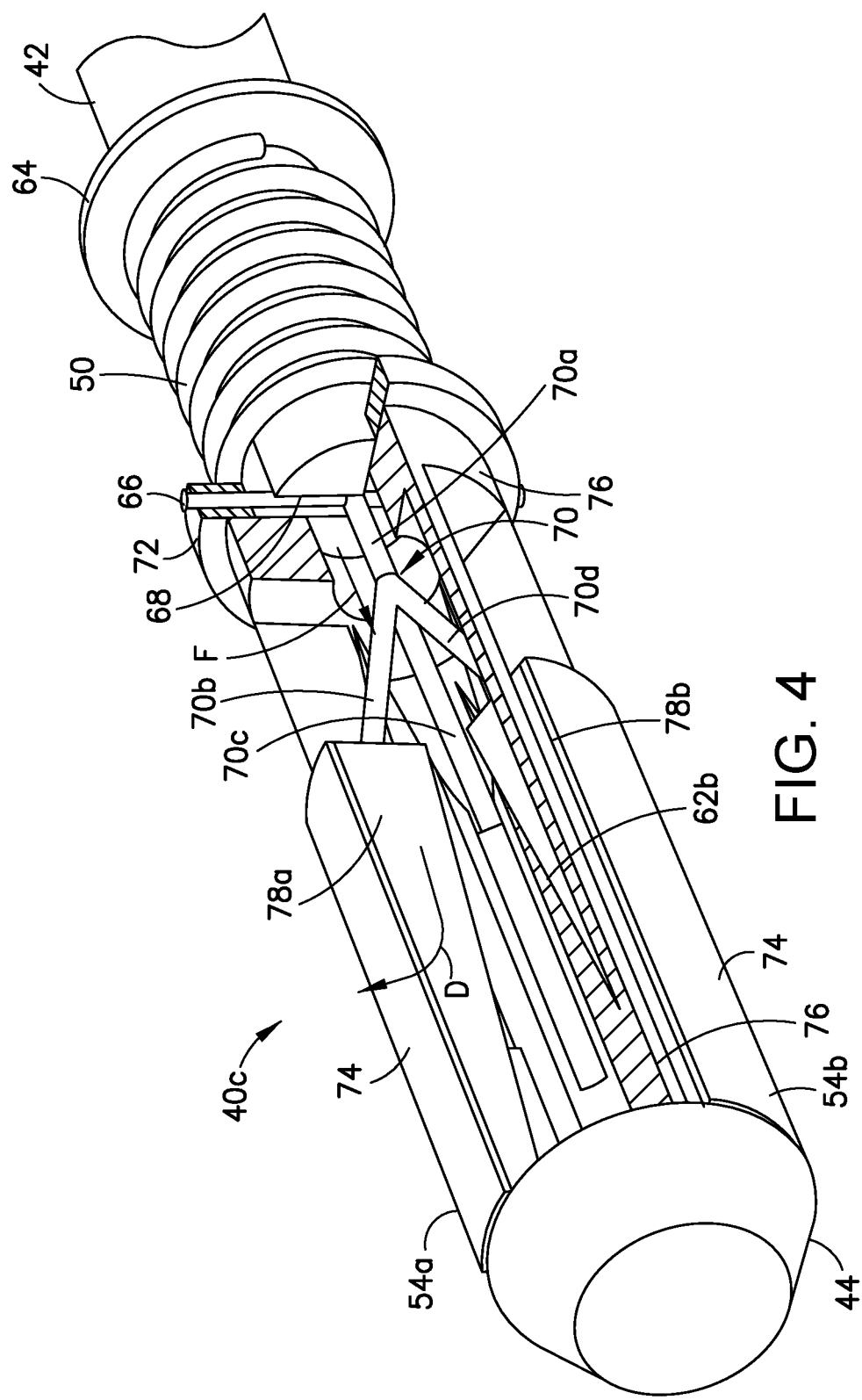
FIG. 4 is a cutaway diagram representing a view of portions of a hole coating applicator in accordance with a third embodiment.
Figure 4A:
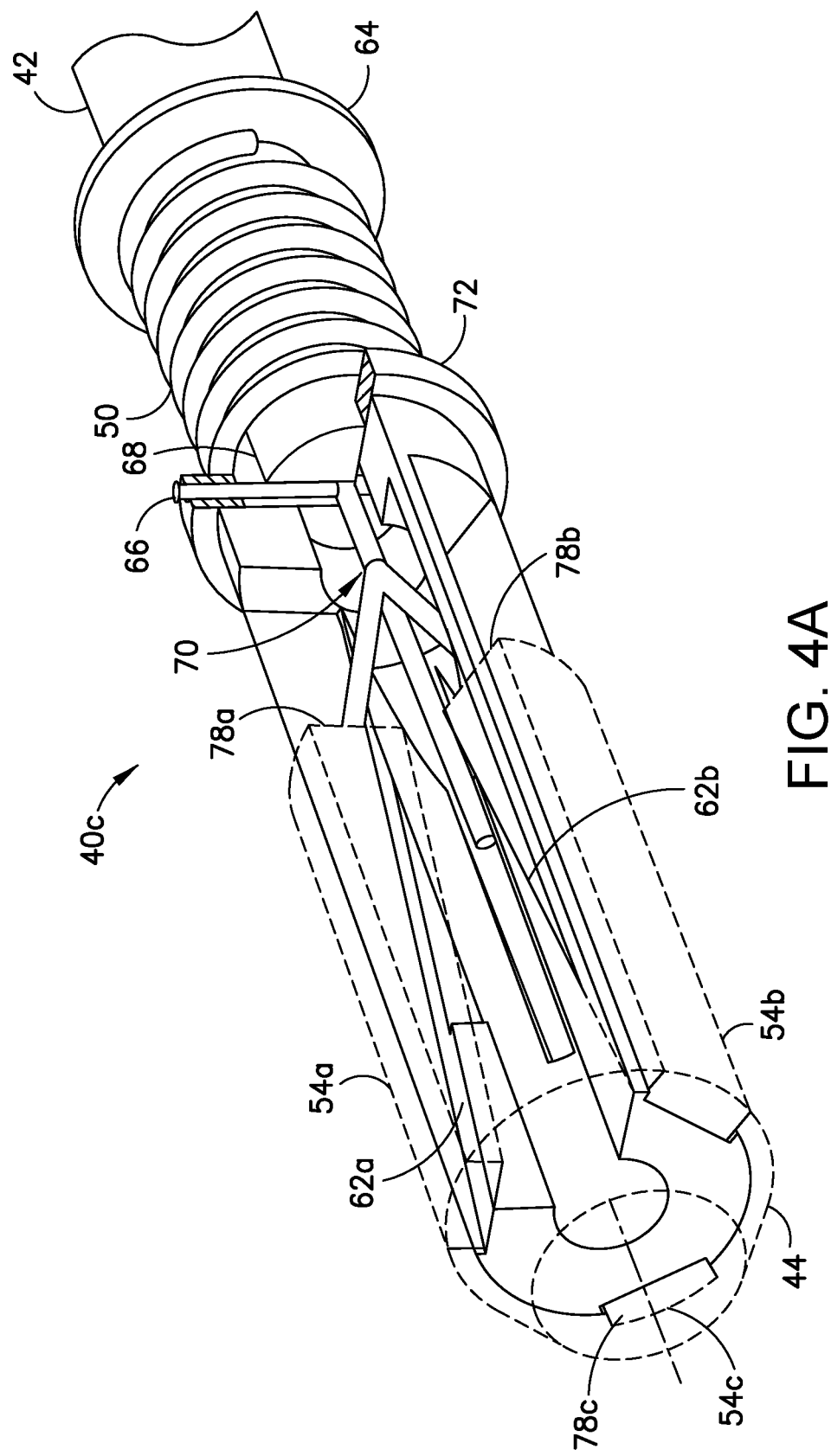
FIG. 4A is a cutaway diagram similar to FIG. 4 except that some components (indicated by dashed lines) of the hole coating applicator in accordance with the third embodiment have been removed to reveal additional internal structure and some hatching has been omitted to avoid clutter in the drawing.

Various embodiments of apparatus for applying solid LMA in a joint hole, such as the hole 20, will now be disclosed with reference to FIGS. 2-10 (and FIGS. 4A and 10A). Each of these embodiments includes a hole coating applicator 40 (see FIG. 15) that may be coupled to the end effector (e.g., a chuck 154) of a machine that has a rotatable and vertically displaceable spindle 150. The common aspect of the embodiments disclosed below is that the hole coating applicator 40 is configured to coat a surface defining a hole 20 by depositing a coating 12 made of electrically conductive material through friction as the hole coating applicator 40 rotates. In accordance with some embodiments, the hole coating applicator 40 includes a shaft 42, which can be gripped by a chuck 154 mounted on the end of a spindle 150 of a stationary drilling machine or a drilling tool attached to a robot or other automated apparatus. The hole coating applicator 40 further includes one or more LMA pads 58a-58c that contact the surface defining the hole 20 in the composite layer 30 with sufficient force to abrade the LMA pads 58a-58c as the spindle 150 rotates. As used herein, the term "LMA pad" refers to a solid block or layer of LMA having a thickness (which may vary along its length) and an outer peripheral surface 74 contoured to rub against the hole 20 during rotation of the hole coating applicator 40.

FIG. 2 is a cutaway diagram representing a view of portions of a hole coating applicator 40a in accordance with a first embodiment. The hole coating applicator 40a includes a shaft 42 having a distal end and an applicator body 46 fixedly coupled to an intermediate portion of shaft 42. The shaft 42 and applicator body 46 are made of metallic alloys, neither of which is low-melting alloy (LMA).

In accordance with the first embodiment, the applicator body 46 includes a non-flexural portion 46a, a first flexural element 46b and a second flexural element 46d. The non-flexural portion 46a is fixedly coupled to the intermediate portion of the shaft 42 at a distance from the distal end of the shaft 42. The first flexural element 46b is configured to bend relative to the non-flexural portion 46a due to flexure of a first flexural hinge 46c. The second flexural element 46d is configured to bend relative to the non-flexural portion 46a due to flexure of a second flexural hinge 46e. The first flexural hinge 46c directly connects the first flexural element 46b to the non-flexural portion 46a, and the second flexural hinge 46e directly connects the second flexural element 46d to the non-flexural portion 46a.

The hole coating applicator 40a further includes a first LMA pad 54a attached to the first flexural element 46b and a second LMA pad 54b attached to the second flexural element 46d. Each of the first and second LMA pads 54a and 54b has an outer peripheral surface 58 that is preferably a section of a right circular cylindrical surface having a radius approximately equal to the radius of the hole 20 (shown in FIG. 1) to be coated with LMA particles. The LMA pads 54a and 54b extend beyond the outer peripheral surfaces of the first and second flexural elements 46b and 46d so that the outer peripheral surfaces of the first and second flexural elements 46b and 46d do not contact the surface defining the hole 20 and the outer peripheral surfaces 58 contact the hole 20 during rotation of the hole coating applicator 40a.

The hole coating applicator 40a can further include a nose 44 having a truncated right circular conical surface. The nose 44 is mounted to the distal end of shaft 42. The tapered circumferential surface of the nose 44 facilitates passage of the nose 44 through the hole 20 during insertion of hole coating applicator 40a. The base 44a of the nose 44 serves as an end stop for a retention spring 50, which is wrapped around a portion of the shaft 42 as seen in FIG. 2. The other end of the retention spring 50 contacts a slider 48 that is slidably coupled to the shaft 42 in a vicinity of the distal ends of the first and second flexural elements 46b and 46d. The distal end of the first flexural element 46b has a circumferential portion of a truncated right circular conical surface 52a, and the distal end of the second flexural element 46d has a circumferential portion of a truncated right circular conical surface 52b. The slider 48 is in the form of a truncated right circular cone having a bore through which the shaft 42 is passed. The outer circumferential surface of slider 48 is a truncated right circular conical surface that abuts the circumferential portions of truncated right circular conical surfaces 52a and 52b of the first and second flexural elements 46b and 46d when the slider 48 is in an abutting position.

The retention spring 50 applies a spring force on the slider 48 that causes the slider 48 to slide axially in the direction indicated by arrow A in FIG. 2. During this slider movement, the third truncated right circular conical surface deflects the distal ends of the first and second flexural elements in opposite directions (indicated by arrows B and C in FIG. 2) away from the shaft 42. More specifically, the contact force exerted by the slider 48 causes the first flexural element 46b to undergo an angular displacement through an angle β. This angular displacement is enabled by the flexure that occurs at the first flexural hinge 46c. The second flexural element 46d undergoes a similar angular displacement due to flexure of the second flexural hinge 46e. In anticipation of these angular deflections, the outer peripheral surfaces 58 of the LMA pads 54*a* and 54*b* are tilted by an angle α to compensate for the displacement angle β. This compensation can ensure that the outer peripheral surfaces 58 will be parallel to the hole to be coated, not tilted. This in turn can ensure that the entirety of each outer peripheral surface 58 is in contact with the hole and subject to abrasion when the hole coating applicator 40*a* is rotated while inside the hole. Preferably the axis of shaft 42 will be coaxial with the axis of the hole during rotation of the hole coating applicator 40*a*.

FIG. 3 is a cutaway diagram representing a view of portions of a hole coating applicator 40*b* in accordance with a second embodiment. The hole coating applicator 40*b* includes a shaft 42 having a distal end, a nose 44 attached to the distal end of shaft 42, and a backstop flange 64 attached to an intermediate portion of shaft 42 at a distance from the nose 44. The hole coating applicator 40*b* further include a pair of camming half-bodies 60*a* and 60*b*, which are loosely coupled to the shaft 42. Each of the camming half-bodies 60*a* and 60*b* has a respective camming surface 62*a* and 62*b*. The respective camming surfaces 62*a* and 62*b* confront each other and, when one is pushed toward the other, come into contact. Each of the camming half-bodies 60*a* and 60*b* also has an outer peripheral surface that is a section of a right circular cylindrical surface. The hole coating applicator 40*b* further includes respective LMA pads 54*a* and 54*b* adhered to portions of the respective outer peripheral surfaces of camming half-bodies 60*a* and 60*b*. The LMA pads 54*a* and 54*b* in turn have respective outer peripheral surfaces 74, which are right circular cylindrical surfaces having a radius that matches the radius of the hole to be coated, as previously described. Each of the LMA pads 54*a* and 54*b* may have a constant thickness.

The hole coating applicator 40*b* further includes a retention spring 50, which is wrapped around a portion of the shaft 42 as seen in FIG. 3. The backstop flange 64 serves as an end stop for the retention spring 50. The other end of the retention spring 50 contacts an end face of the camming half-body 60*a*. The retention spring 50 applies a spring force on the camming half-body 60*a* that urges the camming half-body 60*a* to move axially in the direction indicated by arrow F in FIG. 3. During this movement, the camming surface 62*b* of camming half-body 60*b* deflects the camming half-body 60*a* so that the movement of the camming half-body 60*a* (indicated by arrow D in FIG. 3) has both an axial component and a radially outward component. In addition, the camming surface 62*a* of camming half-body 60*a* cams the camming half-body 60*b* so that camming half-body 60*b* also moves radially outward in a direction opposite to the radially outward movement of camming half-body 60*a* (indicated by arrow E in FIG. 3). The effect of this radial expansion of the camming half-bodies 60*a* and 60*b* is to press the outer peripheral surfaces of the LMA pads 54*a* and 54*b* against opposing sides of the hole during rotation of the hole coating applicator 40*b*. The magnitude of the pressure exerted is designed to produce frictional forces sufficient to abrade the LMA pads during rotation of the hole coating applicator 40*b*, causing the deposition of LMA particles on the hole. This deposition is continued until a desired thickness of the coating 12 in a hole 20 is achieved.

FIG. 4 is a cutaway diagram representing a view of portions of a hole coating applicator 40*c* in accordance with a third embodiment. FIG. 4A is a cutaway diagram similar to FIG. 4 except that some components (indicated by dashed lines) of the hole coating applicator 40*c* have been removed to reveal additional internal structure and some hatching has been omitted to avoid clutter in the drawing.

As seen in FIG. 4, the hole coating applicator 40*c* includes a shaft 42, an applicator body 76 integrally formed with or joined to a distal end of the shaft 42, a nose 44 attached to the distal end of the applicator body 76, and a backstop flange 64 attached to an intermediate portion of shaft 42 at a distance from applicator body 76. The hole coating applicator 40*c* further include three camming blocks 78*a*-78*c*, which are slidably coupled to the applicator body 76 for sliding along respective camming surfaces 62*a*, 62*b* formed inside the applicator body 76. Only two camming surfaces 62*a* and 62*b* of the three camming surfaces are visible in FIGS. 4A and 5. Each camming block 78*a*-78*c* has a respective inclined surface that confronts and contacts the camming surfaces 62*a*, 62*b* formed inside the applicator body 76.

Figure 8:
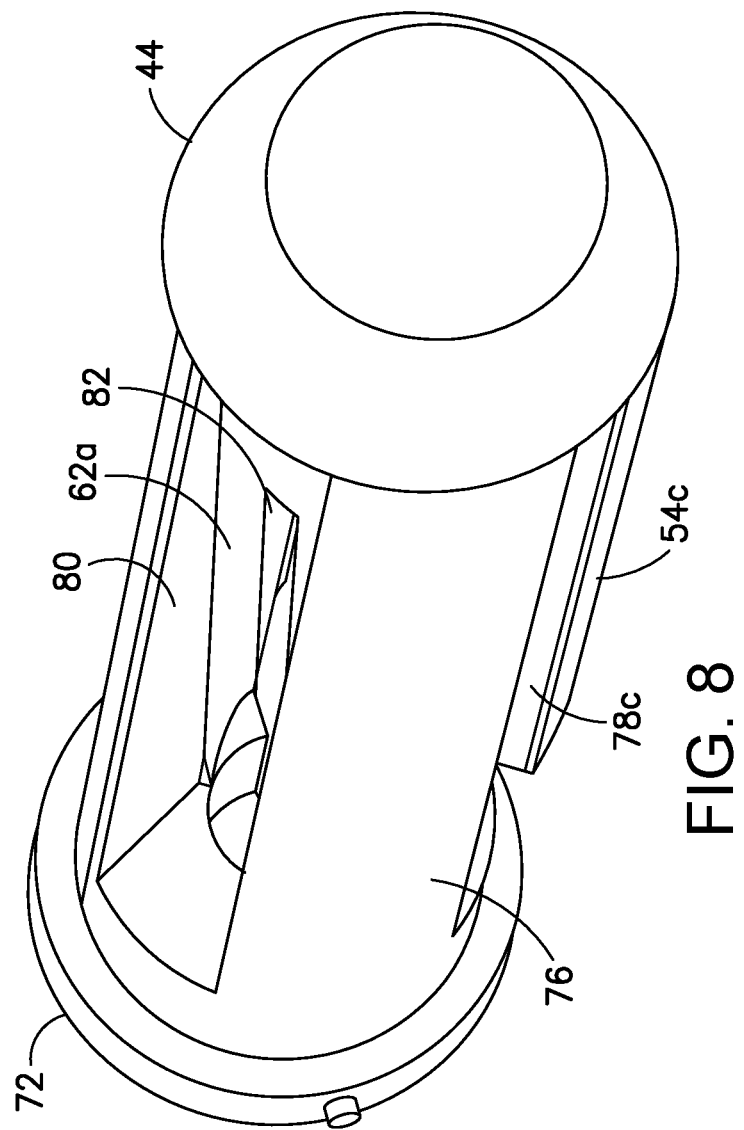
FIG. 8 is a diagram representing a view of the applicator body and the sliding annular ring in accordance with the third embodiment.

FIG. 8 provides some insight into the construction of the applicator body 76 in accordance with the third embodiment. The camming block 78*a* has been removed to reveal the camming surface 62*a*, which borders an opening 82 on three sides. The push rod link 70*d* passes through the opening 82. Movement of the camming block 78*a* is constrained in transverse directions by a pair of mutually opposing planar guide walls 80, only one of which is visible in FIG. 8. Movement of the camming block 78*a* is constrained in the radially outward direction by any suitable means. For example, the guide walls 80 may be provided with projections that engage linear channels formed in the corresponding camming block 78*a* to prevent the camming block 78*a* from falling out of the applicator body 76.

Accordingly, any movement of the camming blocks 78*a*-78*c* toward the nose 44 can result in the camming blocks 78*a*-78*c* moving parallel to the camming surfaces, which are inclined at an oblique angle relative to an axis of shaft 42. In other words, the movement of each camming block 78*a*-78*c* has both an axial component and a radially outward component, as indicated by arrow D in FIG. 4. The radial outward movements of the three camming blocks 78*a*-78*c* will be referred to herein as "radial expansion".

Each of the camming blocks 78*a*-78*c* also has an outer peripheral surface that is a section of a right circular cylindrical surface. The hole coating applicator 40*c* further includes respective LMA pads 54*a*-54*c* (only LMA pads 54*a* and 54*b* are visible in FIG. 4) adhered to the outer peripheral surfaces of camming blocks 78*a*-78*c* respectively. The LMA pads 54*a*-54*c* in turn have respective outer peripheral surfaces 74, which are right circular cylindrical surfaces having a radius that matches the radius of the hole to be coated, as previously described. Each of the LMA pads 54*a*-54*c* may have a constant thickness.

As best seen in FIG. 4, the trio of camming blocks 78*a*-78*c* are configured to move in unison in response to axial displacement of a push rod linkage 70 including a push rod 70*a* and three push rod links 70*b*-70*d*. Although pivotable couplings (e.g., revolute joints) are not shown in the drawings, the push rod links 70*b*-70*d* are pivotably coupled to one end of the push rod 70*a*. The other ends of the push rod links 70*b*-70*d* are pivotably coupled to the respective camming blocks 78*a*-78*c*. An end portion of the push rod 70*a* may be seated in an axial bore (not shown in the drawings) formed in the shaft 42 to constrain the movement of the push rod 70*a* to be axial only. As the push rod 70*a* is displaced axially toward the nose 44, the push rod links 70*b*-70*d* push the respective camming blocks 78*a*-78*c* along the respective inclined camming surfaces (only camming surfaces 62*a* and 62*b* are visible in FIGS. 4A and 5) to produce the desired radial expansion of the LMA pads 54*a*-54*c* into contact with the hole to be coated.

The hole coating applicator 40b can further includes a retention spring 50, which is wrapped around a portion of the shaft 42 as seen in FIG. 4. The backstop flange 64 serves as an end stop for the retention spring 50. The other end of the retention spring 50 contacts and exerts a spring force on an annular ring 72 that is slidable along the portion of shaft 42 around which the spring 50 is wrapped. The annular ring 72 is slidable between the end position depicted in FIGS. 4, 4A and 5), whereat the front surface of the annular ring 72 abuts an annular end face (hereinafter "end stop 77") of the applicator body 76 (end stop 77 is best seen in FIG. 6), and a position displaced from that end position (i.e., in a direction away from nose 44), whereat the retention spring is in a more compressed state than the state of compression when the annular ring 72 is at an end position.

Figure 5:
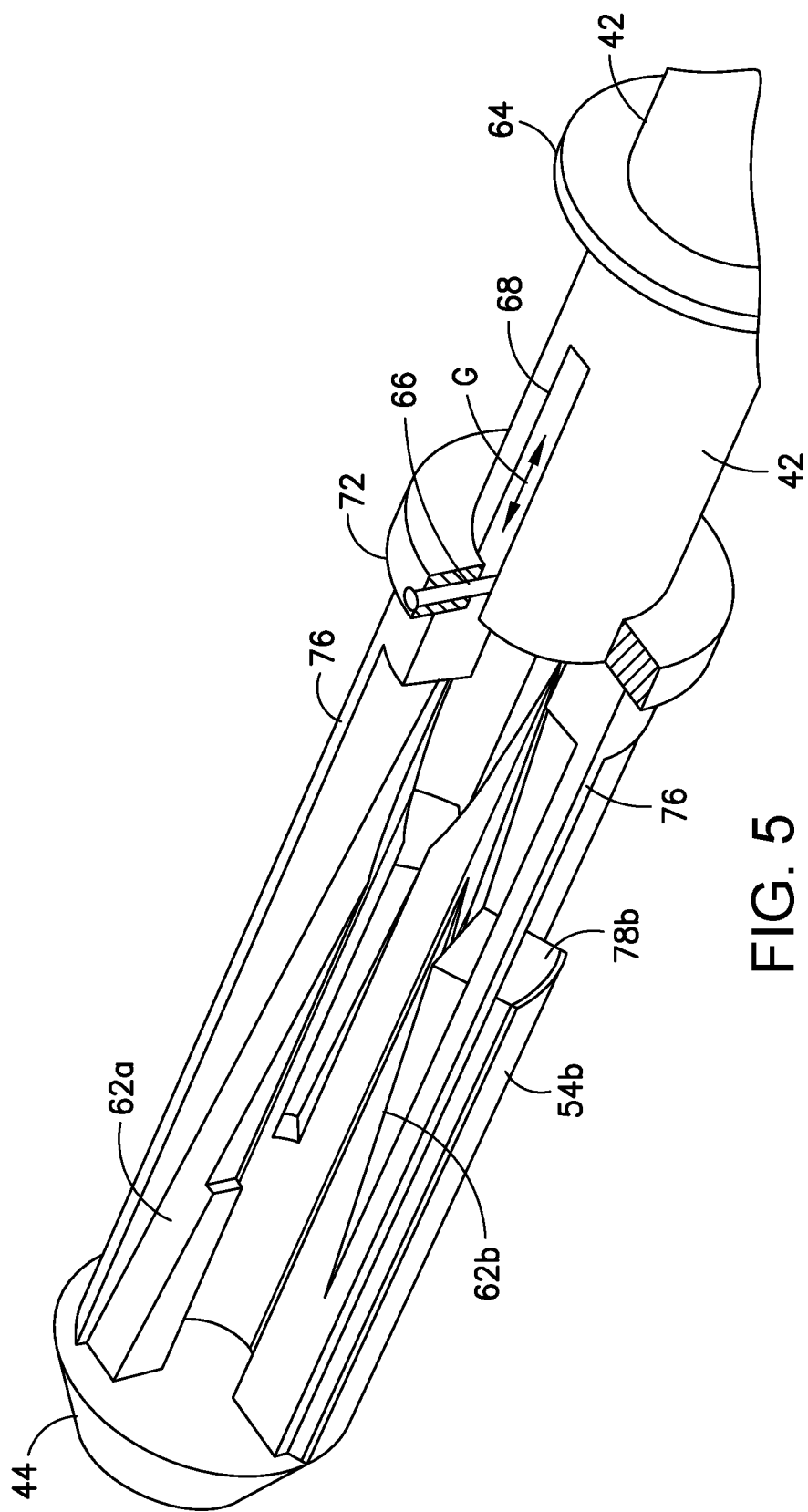
FIG. 5 is a cutaway diagram representing a different view of portions of the hole coating applicator in accordance with the third embodiment.
Figure 6:
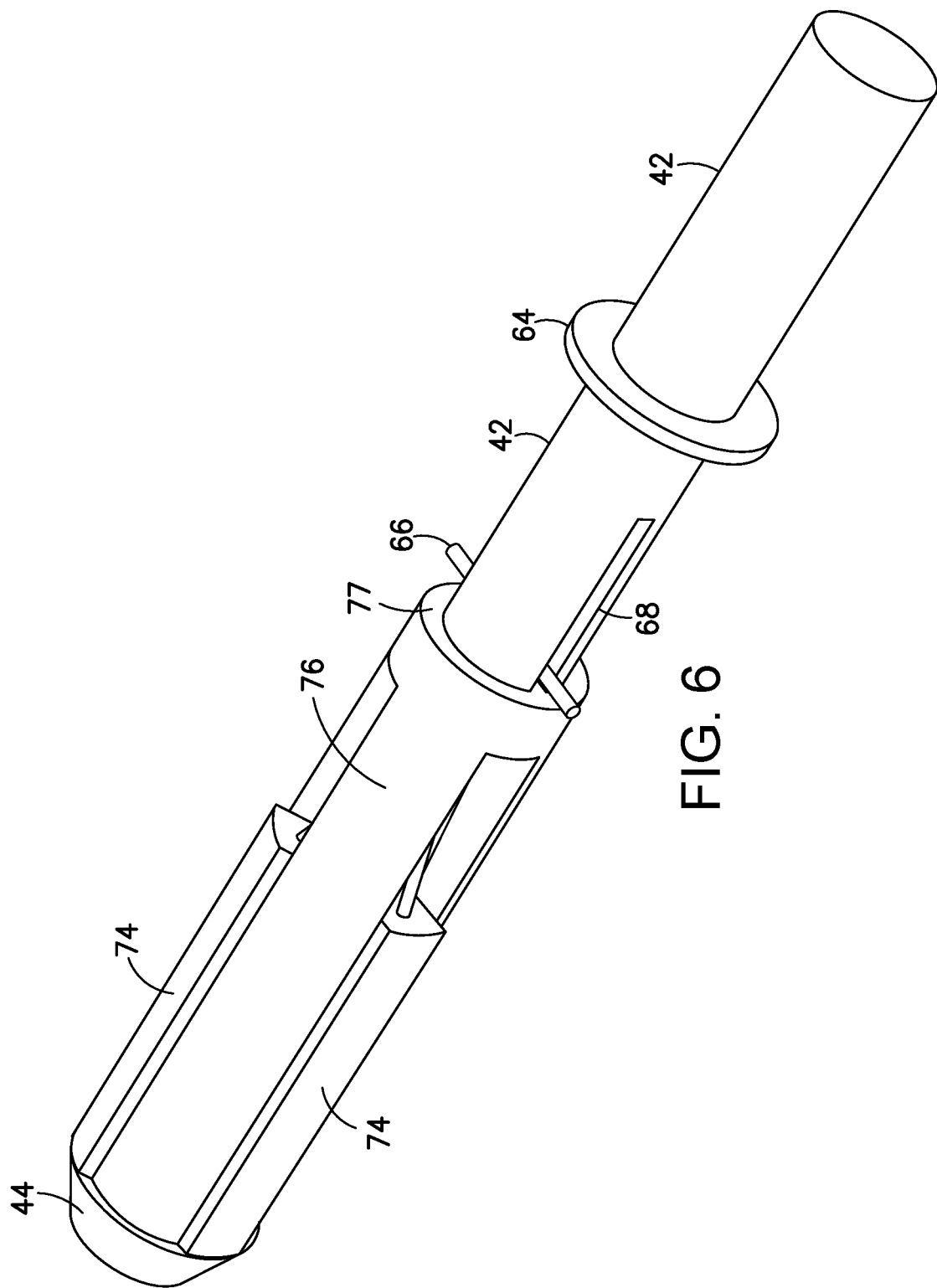
FIG. 6 is a diagram representing another view of the hole coating applicator in accordance with the third embodiment except that a sliding annular ring has been removed to reveal a transverse pin that slides in a slot formed in the shaft of the hole coating applicator.

The function of the annular ring 72 may be gleaned from the fact that the annular ring 72 has two diametrically opposed radial bores that hold a transverse pin 66, seen in FIGS. 4, 4A, and 5. As shown in FIG. 4, the transverse pin 66 is fixedly coupled to the push rod 70a so that the annular ring 72 and the push rod 70a move in tandem. This arrangement can enable the spring force of the retention spring 50 to axial displace the push rod 70a toward the nose 44 by pushing the annular ring 72 toward its end position, which in turn displaces the push rod linkage 70 toward the nose 44, thereby causing the LMA pads 54a-54c to radially expand into contact with the hole.

Figure 7:
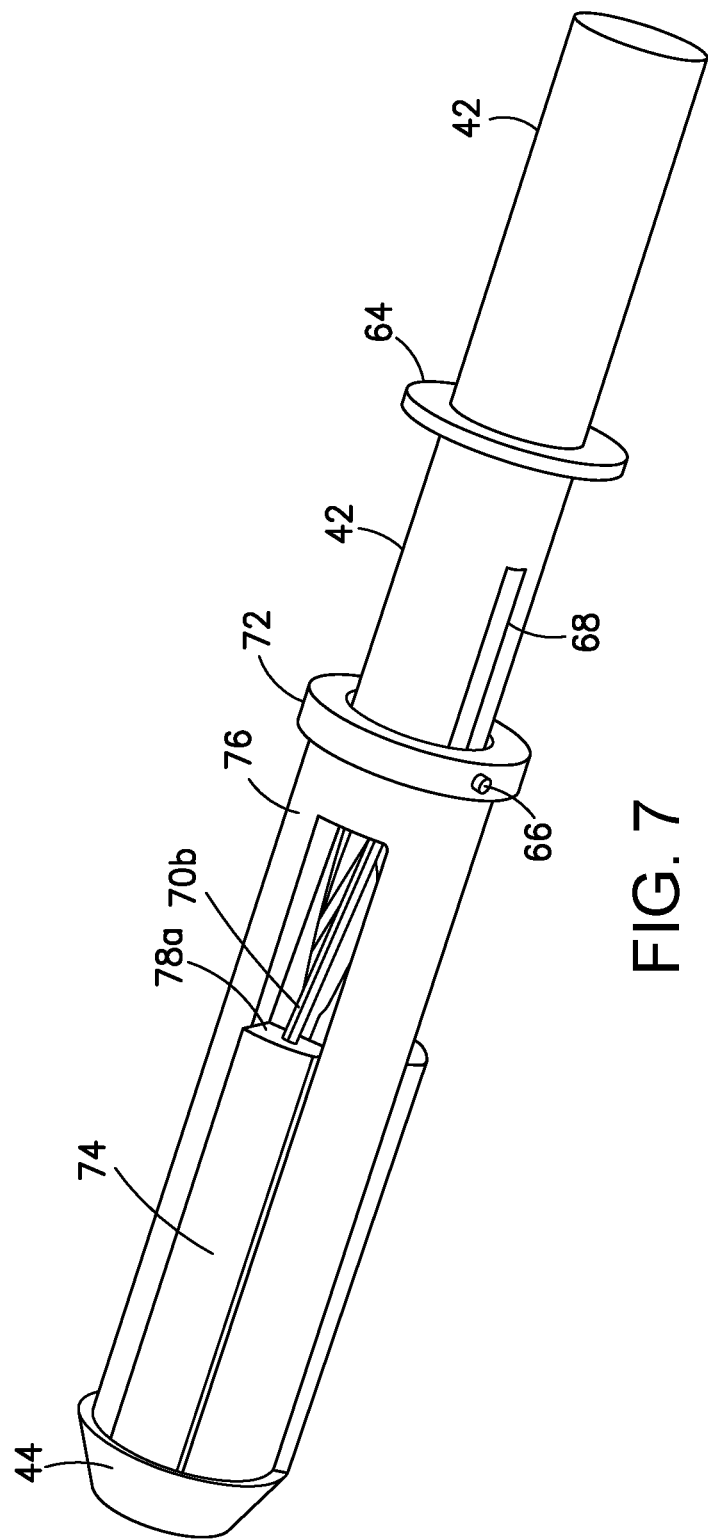
FIG. 7 is a diagram representing a view similar to the view in FIG. 6, but with the sliding annular ring in place adjacent an end stop formed by an applicator body integrally formed with or joined to the hole coating applicator shaft.

The portion of the transverse pin 66 that spans the opening of the annular ring 72 is seated in a slot 68 formed in the portion of shaft 42 around which the retention spring 50 is wrapped. The retention spring 50 has been omitted from each of FIGS. 5-7 in order to reveal the slot 68, which extends diametrically across and axially along the shaft 42. FIG. 5 shows the transverse pin 66 seated inside the slot 68. The transverse pin 66 is axially movable in either direction inside the slot 68, as indicated by the double-headed arrow G. FIG. 6 shows the transverse pin 66 with the annular ring 72 also omitted. FIG. 7 shows the annular ring 72 in an end position whereat the front face of the annular ring 72 abuts an annular end face (not visible in FIG. 7) of the applicator body 76.

The only interference section of the hole coating applicator 40c are the LMA pads 54a-54c and not the conical nose 44. The nose 44 guides the hole coating applicator 40c into the hole. The diameter of the base 44a of nose 44 is smaller than the hole diameter. The contact with the CFRP hole 20 occurs after the nose insertion. At this point, due to interference and friction, the LMA pads 54a-54c move down the inclined paths and compress the retention spring 50 on the back side until the outer peripheral surfaces 74 of the LMA pads 54a-54c contact the hole 20. The spring compression provides a steady outward radial force to sustain the firm contact between the LMA pads 54a-54c and the CFRP hole. The magnitude of the compressive force produces frictional forces sufficient to abrade the LMA pads 54a-54c during rotation of the hole coating applicator 40c, causing the deposition of LMA particles on the surface defining hole 20. This deposition is continued until a desired thickness of the coating 12 is achieved.

Figure 9:
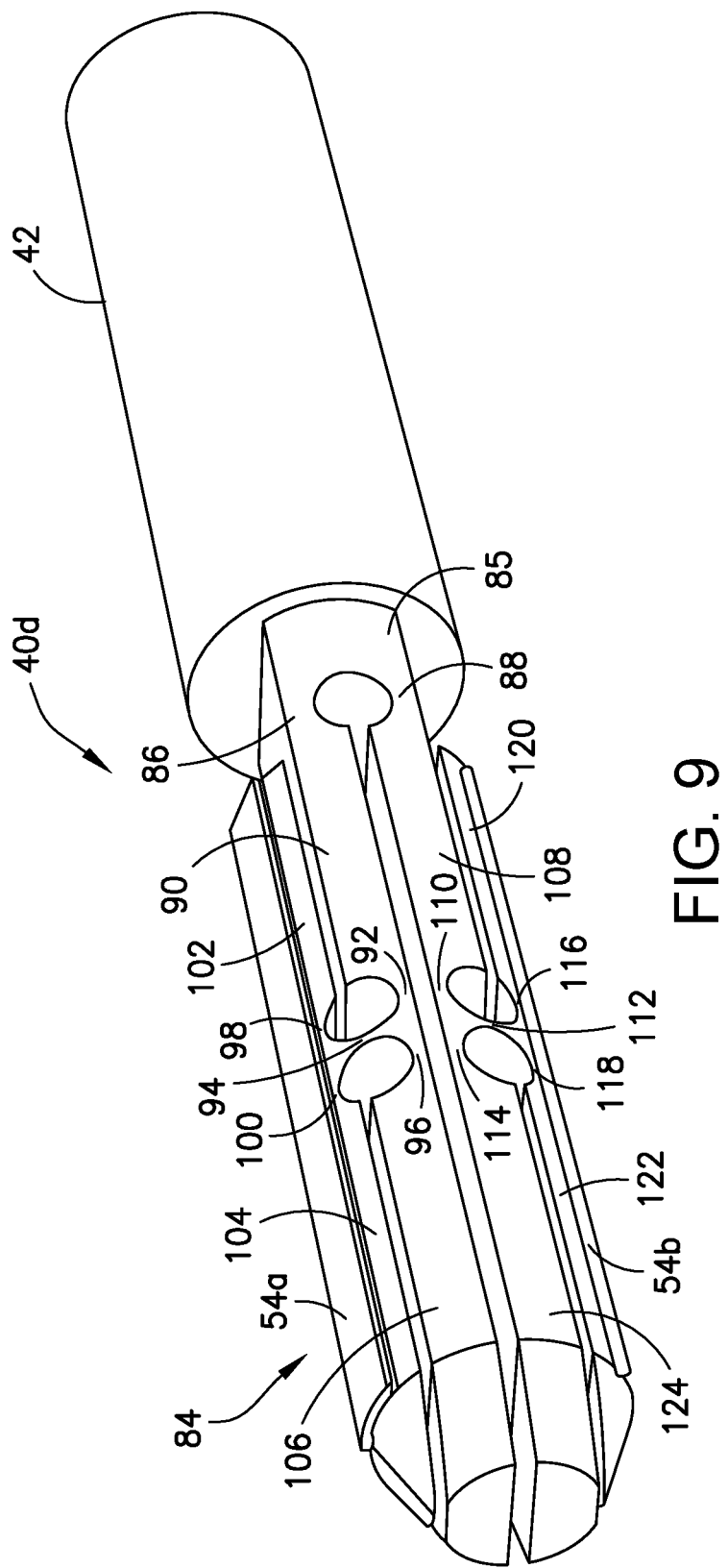

FIGS. 9 and 10 are diagrams representing different views of a hole coating applicator 40d in accordance with a fourth embodiment. The hole coating applicator 40a includes a shaft 42 having a distal end and a monolithic applicator body 84 fixedly coupled to or integrally formed with the distal end of shaft 42. (In the latter case, the shaft 42 and applicator body 84 collectively form a monolithic structure.) The shaft 42 and applicator body 84 are made of a metallic alloy that is not a low-melting alloy (LMA).

In accordance with the fourth embodiment, the applicator body 84 includes a non-flexural portion 85, a flexural element 90 and a flexural element 106. The non-flexural portion 85 is fixedly coupled to the distal end of the shaft 42. The flexural element 90 is configured to bend relative to the non-flexural portion 85 due to flexure of a flexural hinge 86. The flexural element 106 is configured to bend relative to the flexural element 90 due to flexure of flexural hinges 92 and 96. The flexural hinge 86 connects the flexural element 90 to the non-flexural portion 85, and the flexural hinges 92 and 96 connect the flexural elements 90 and 106 to each other. The applicator body 84 further includes a flexural element 102 and a flexural element 104. The flexural element 102 is configured to bend relative to the flexural elements 90 and 106 due to flexure of flexural hinges 94 and 98. The flexural element 104 is configured to bend relative to the flexural elements 90 and 106 due to flexure of flexural hinges 94 and 100. The flexural hinges 98 and 100 connect the flexural elements 90 and 106 to each other.

In accordance with the fourth embodiment, the applicator body 84 further includes a flexural element 108 and a flexural element 124. The flexural element 108 is configured to bend relative to the non-flexural portion 85 due to flexure of a flexural hinge 88. The flexural element 124 is configured to bend relative to the flexural element 108 due to flexure of flexural hinges 110 and 114. The flexural hinge 88 directly connects the flexural element 108 to the non-flexural portion 85. The flexural hinges 110 and 114 connect the flexural elements 108 and 124 to each other. The applicator body 84 further includes a flexural element 120 and a flexural element 122. The flexural element 120 is configured to bend relative to the flexural elements 108 and 124 due to flexure of flexural hinges 112 and 116. The flexural element 122 is configured to bend relative to the flexural elements 108 and 124 due to flexure of flexural hinges 112 and 118. The flexural hinges 116 and 118 connect the flexural elements 120 and 122 to each other.

Referring to FIG. 10A, the intersection 1a that connects the flexural hinges 94, 98, and 100 and the intersection 1b that connects the flexural hinges 92, 94, and 96 are connected by flexural hinge 94. The intersection 1c that connects the flexural hinges 112, 116, and 118 and the intersection 1d that connects the flexural hinges 110, 112, and 114 are connected by flexural hinge 112.

The foregoing structure enables every flexural element to bend relative to the non-flexural portion 85 of the applicator body 84 and relative to the shaft 42 due to flexure of one more flexural hinges. For example, the flexural element 102 is configured to bend relative to the non-flexural portion 85 due to flexure of flexural hinges 98, 94, 92, and 86; the flexural element 104 is configured to bend relative to the non-flexural portion 85 due to flexure of flexural hinges 100, 94, 92, and 86; the flexural element 120 is configured to bend relative to the non-flexural portion 85 due to flexure of flexural hinges 116, 112, 110, and 88; and the flexural element 122 is configured to bend relative to the non-flexural portion 85 due to flexure of flexural hinges 118, 112, 110, and 88. The monolithic hole coating applicator 40d has self-aligning and centering capabilities due to the flexural hinges.

The hole coating applicator 40d further includes a first LMA pad 54a attached to the outer peripheral surface of flexural elements 102 and 104 and intersection 1a. The hole coating applicator 40d can include a second LMA pad 54b attached to the outer peripheral surface of flexural elements 120 and 122 and intersection 1c. During rotation of the hole coating applicator 40d while applicator body 84 is inside a hole, the flexural elements bend radially outward into contact with the hole due to centripetal forces. Although not shown in FIGS. 9 and 10, the flexural elements 102 and 104 in an unflexed state may be tilted slightly toward the center axis of the hole coating applicator 40d so that radially outward bending during rotation produces alignment of the LMA pads 54a and 54b. The same is true for flexural elements 120 and 122. The speed of rotation of shaft 42 should be sufficiently high that the magnitude of the resulting frictional forces produced at the interface between the LMA pads 54a and 54b and the hole will cause the LMA to abrade and deposit on the hole. This deposition is continued until a desired thickness of the hole coating is achieved.

Figure 20:
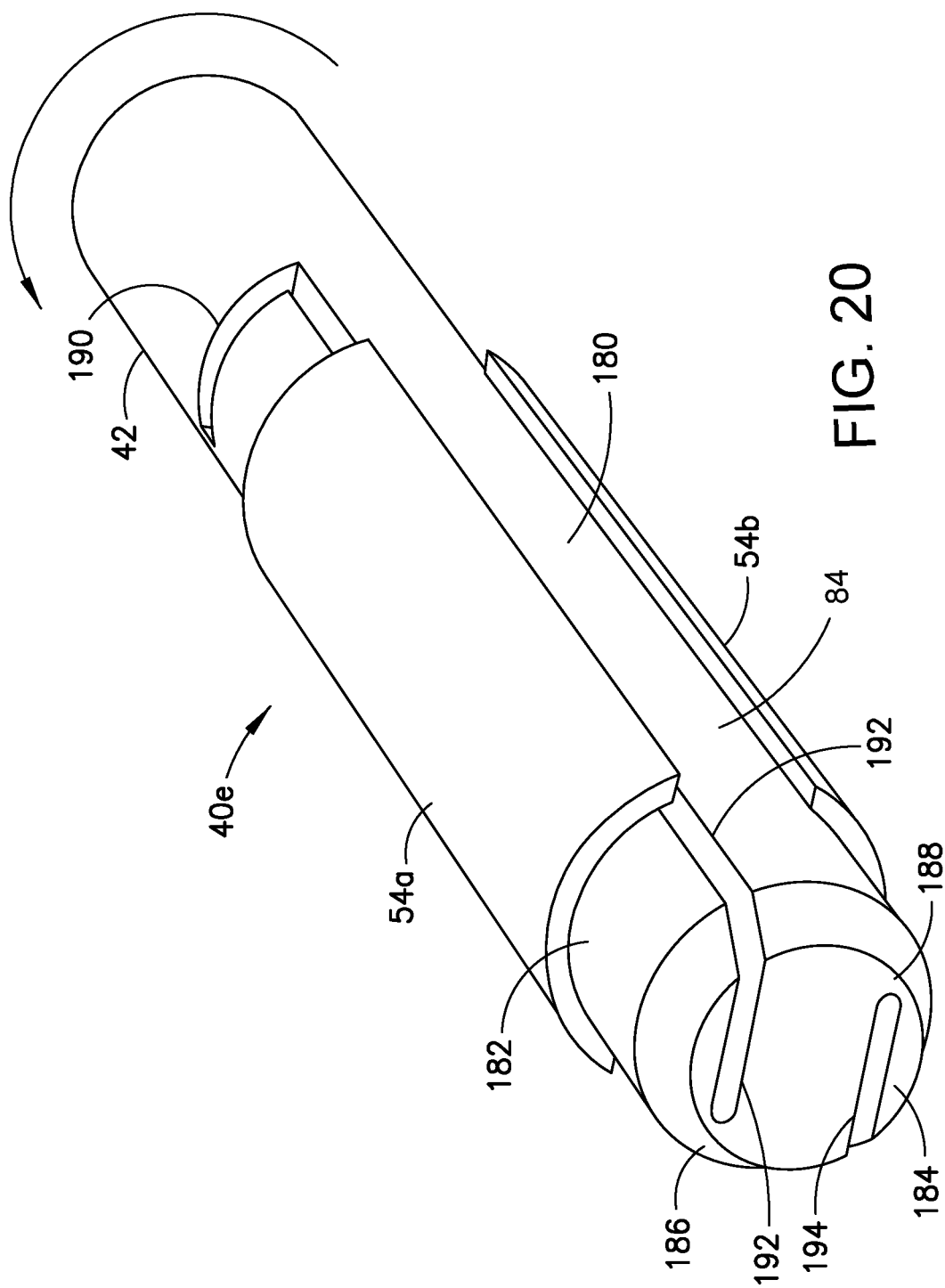
FIG. 20 is a diagram representing a view of portions of a hole coating applicator in accordance with a fifth embodiment.

FIG. 20 is a diagram representing a view of portions of a hole coating applicator 40e in accordance with a fifth embodiment. The hole coating applicator 40e includes a shaft 42 having a distal end and a monolithic applicator body 84 fixedly coupled to or integrally formed with the distal end of shaft 42. (In the latter case, the shaft 42 and applicator body 84 collectively form a monolithic structure.) The shaft 42 and applicator body 84 are made of a metallic alloy that is not a low-melting alloy (LMA).

In accordance with the fifth embodiment, the applicator body 84 includes a non-flexural portion 180, a radial flexural element 182 and a radial flexural element 184. The non-flexural portion 180 is fixedly coupled to the distal end of the shaft 42. The radial flexural element 182 is configured to bend relative to the non-flexural portion 180 due to flexure of an axial flexural hinge 186. The radial flexural element 184 is configured to bend relative to the non-flexural portion 180 due to flexure of an axial flexural hinge 188. The radial flexural element 182 is separated from the shaft 42 by a gap 190 and is separated from the non-flexural portion 180 by a gap 192. The radial flexural element 184 is separated from the shaft 42 by a gap (not visible in FIG. 17) and is separated from the non-flexural portion 180 by a gap 194.

The hole coating applicator 40e further includes a first LMA pad 54a attached to the outer peripheral surface of radial flexural elements 182 and a second LMA pad 54b attached to the outer peripheral surface of radial flexural element 184. During rotation of the hole coating applicator 40e while applicator body 84 is inside a hole, the radial flexural elements 182 and 184 will bend radially outward into contact with the hole due to centripetal forces. The use of radial flexural elements 182 and 184 may improve the LMA delivery to the CFRP surface with fewer turns. Also, the unidirectional spin (indicated by the curved arrow in FIG. 17) of the applicator allows a very stable response between the applicator and the CFRP surface. By adjusting the thickness of the axial flexural hinges 186 and 188 and by material selection, one can achieve a desired radial force. Also, the displacement is parallel to the hole. Lastly, the hinge orientation and rotational direction provide a smooth engagement between the CFRP and the LMA pads 54a and 54b.

Optionally, after a first coating made of solid LMA has been applied using one of the applicators disclosed above, a second coating of LMA may be applied over the first coating using molten LMA. The benefit of this two-stage application procedure is that the surface of the second coating may be smoother than the surface of the first coating.

Suitable LMAs include alloys of two or more elements of the following: bismuth, indium, tin, lead, and antimony. A preferred LMA is a ternary alloy consisting of a mixture of bismuth (preferably more than 50%), indium and tin. Due to its softness, the LMA performs like a solid lubricant and fastener insertion is easier with lower insertion force for interference fit.

To ensure that a sufficient amount of LMA is applied in a particular composite joint installation, a real-time monitoring system that includes a resistance measuring circuit 36 can be employed to verify that the contact resistance is within an acceptable range. The monitoring system disclosed in some detail hereinafter utilizes a capacitive coupling to measure the effective resistance of the LMA resistance and the random parallel resistance of the carbon fibers in the CFRP layer in series. The LMA resistance through the thickness is orders of magnitude less than the resistance of the CFRP layer. Therefore the LMA resistance can be ignored. For example, the LMA thickness variation makes the LMA resistance change by a few micro-Ohms while the interface resistance is about a few milli-Ohms. The net resistance variation is completely a function of carbon fiber connectivity at the hole interface, which in turn depends only on the quality and quantity of the LMA coating. The capacitive coupling segment described herein can allow the monitoring system to measure resistance with one contact point only. A feedback loop is used to control the LMA application process (applicator insertion and rotation) and confirm completion to a satisfactory resistance level based on the response by the monitoring system. By depositing LMA to form a coating on the joint hole, concurrently measuring the effective resistance of the LMA and carbon fibers in series, and then ceasing deposition when a specified effective resistance is achieved, at least a minimum acceptable electrical conductivity at the hole/fastener interface can be achieved in the final structural assembly.

Figure 11:
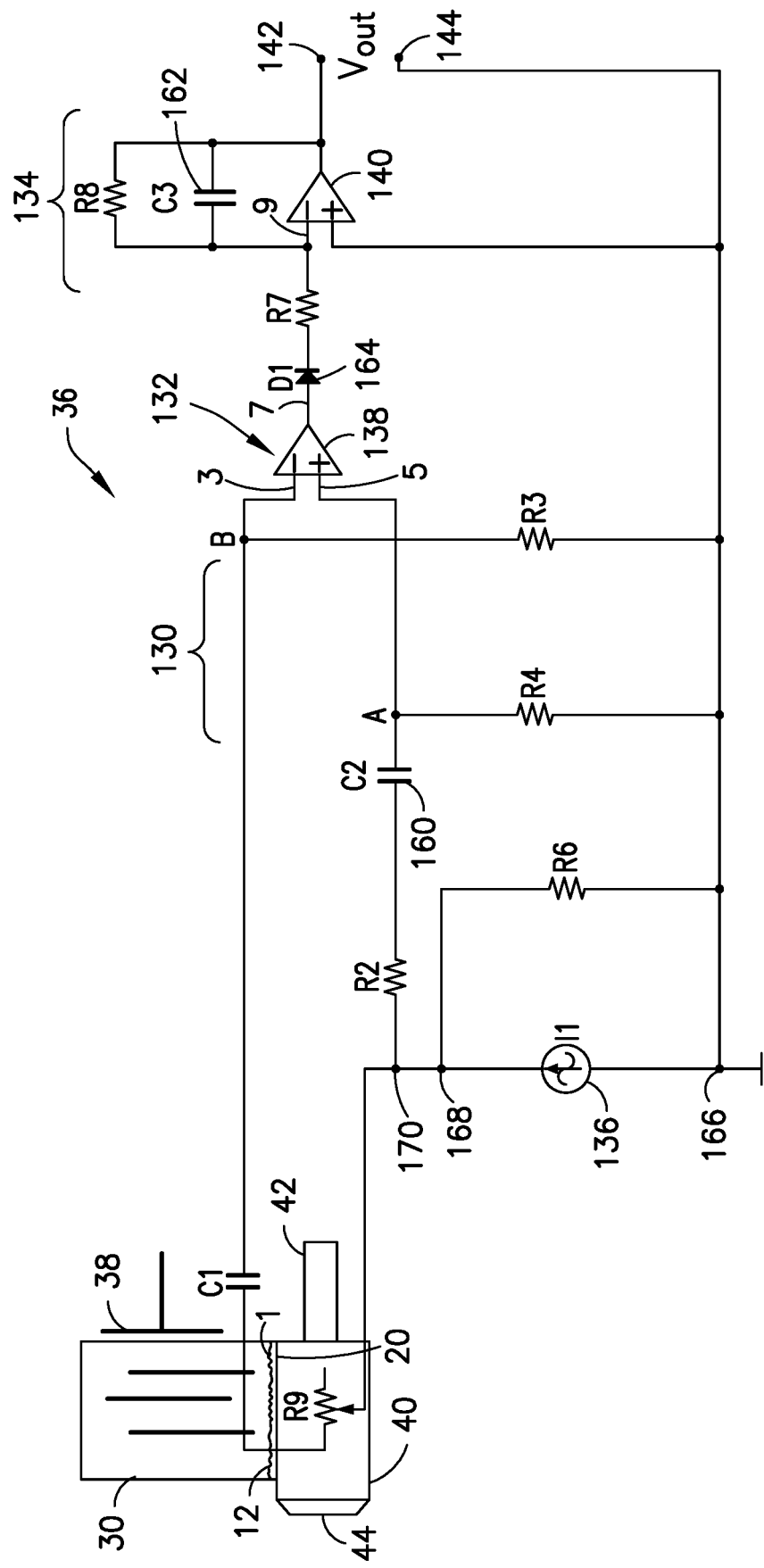
FIG. 11 is a circuit diagram representing electrical circuitry of a resistance measuring probe designed to measure the thickness of an electrically conductive coating applied in a joint hole formed in a layer of composite material.

FIG. 11 is a circuit diagram representing a resistance measuring circuit 36 designed to measure a resistance that is indicative of the thickness of coating 12 applied in a joint hole 20 formed in a composite layer 30. (The composite material on the other side of the hole 20 is not shown in FIG. 11.) In the scenario depicted in FIG. 11, the resistance measuring circuit 36 is measuring the effective resistance of a coating 12 made of LMA and the random parallel resistance of the carbon fibers in a composite layer 30 made of CFRP in series. This measurement is accomplished by placing a capacitive sensing pad 38 having an annular shape in contact with an annular portion of the surface of the composite layer 30 that surrounds the hole 20. Although not shown in FIG. 11, the capacitive sensing pad 38 includes a dielectric coating 39 (see FIG. 16) with an electrically conductive sensing element (e.g., a copper plate, film or coating) attached to one side of the dielectric coating. The dielectric coating 39 can maintain a space between the sensing element and the composite layer 30 to prevent a short circuit. As a result, the sensing pad 38 and the confronting portion of the composite layer 30 form a capacitor having a capacitance C1.

The resistance measuring circuit 36 includes a pair of terminals A and B which form a modified resistance-capacitance (RC) Wheatstone bridge 130. (A Wheatstone bridge is an electrical circuit used to measure an unknown electrical resistance by balancing two legs of a bridge circuit, one leg of which includes the unknown component.) The sensing pad 38 is electrically connected to terminal B. The terminal A is connected to one side of a capacitor 160 having a capacitance C2. The other side of capacitor 160 is connected in series to a resistance R2, which is in turn electrically connected in series to the applicator 40 by way of a junction 170. The effective resistance of coating 12 and composite layer 30 in series is represented by a variable resistance R9

Figure 14:
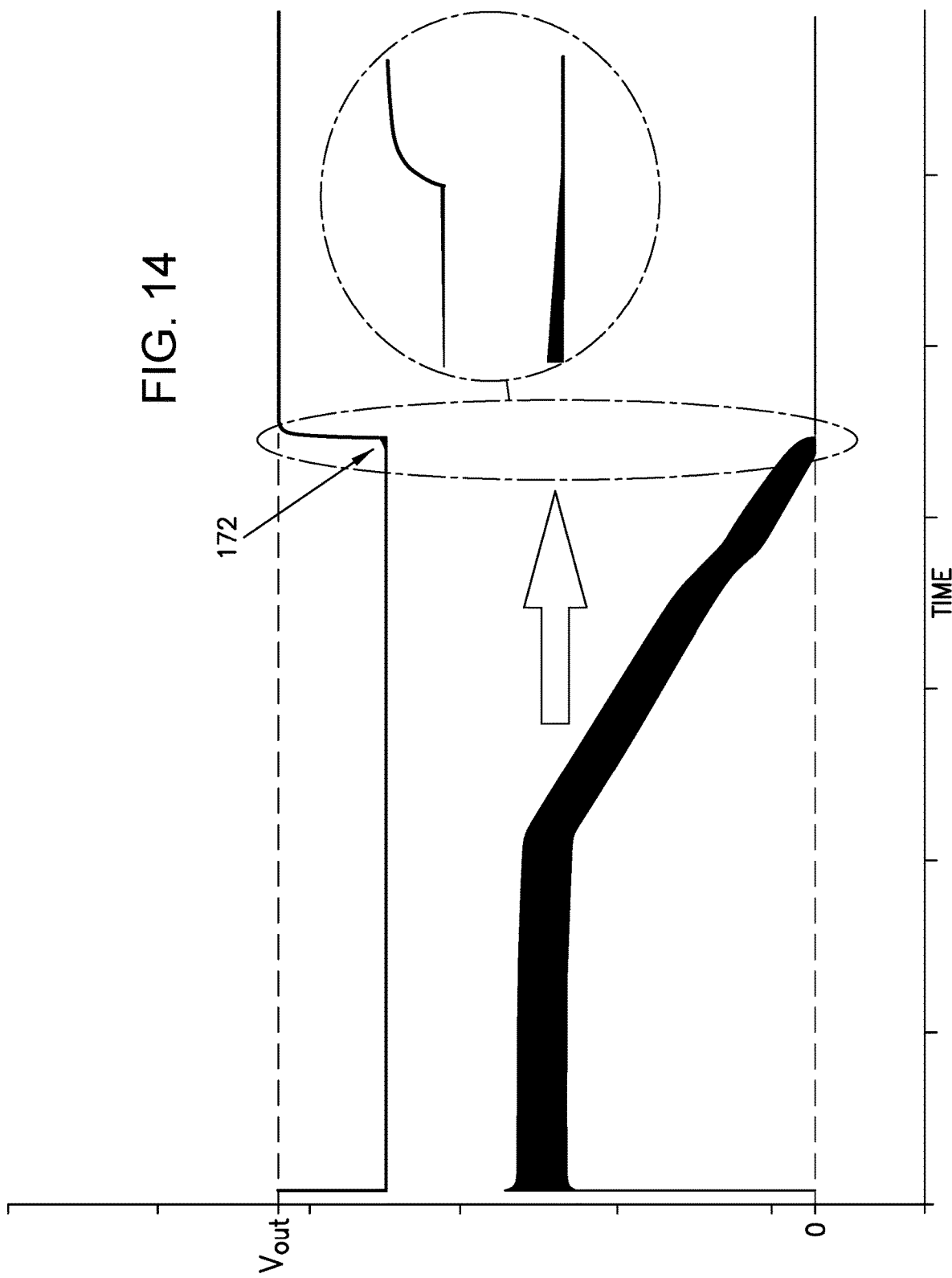
FIG. 14 includes two graphs of voltage versus time: the upper graph shows how the output voltage $V_{out}$ changes significantly when the hole resistance reaches the desired value; the lower graph shows how the A-B bridge output voltage decreases as the hole resistance approaches the desired value.

(hereinafter "effective resistance R9") in FIG. 11. The effective resistance R9 varies in dependence on the degree of carbon fiber connectivity to the coating 12. The applicator 40 is also electrically connected in series by way of junction 170 to a high-frequency alternating current source 136, which provides a high-frequency alternating current during coating deposition. That high-frequency alternating current flows through the rotating applicator 40, through the coating 12 and into the composite layer 30, producing a displacement current in the sensing pad 38. As the thickness of the coating 12 increases, the effective resistance R9 decreases until the resistance R9 equals the resistance R2. As shown in FIG. 14, the voltage difference between the A-B terminals of modified RC Wheatstone bridge 130 decreases as the effective resistance R9 decreases.

Still referring to FIG. 11, the voltage difference between the A-B terminals of modified RC Wheatstone bridge 130 is input to an operational amplifier 138. The output terminal 7 of operational amplifier 138 is connected to a negative input terminal 9 of an operational amplifier 140 by way of a rectifier 164 (although represented as a single diode, rectifier 164 may include multiple diodes) and a resistance R7 in series. The operational amplifier 139 operates as a comparator which compares the effective resistance R9 (which is variable) to resistance R2 (which is adjustable). More specifically, resistance R2 can be heuristically evaluated over many separate measurements of what one might consider a satisfactory interface. The resistance R2, which is dependent on the application or the installation configuration, particularly for different material systems, could be very different values. The resistance R2 can be easily adjusted with a series of predefined resistances R2, very similar to range selection of a multimeter.

Returning attention to FIG. 11, the positive input terminal of the operational amplifier 140 is connected to ground by way of a junction 166 located between the high-frequency alternating current source 136 and ground. In addition, junction 166 is electrically connected: to a junction 168 (situated between junction 170 and the high-frequency alternating current source 136) by way of a resistance R6; to terminal A by way of a resistance R4; and to terminal B by way of a resistance R3.

The operational amplifier 138 has first and second input terminals 3 and 5. The first input terminal 3 receives alternating current from the alternating current source 136 after it has flowed through a composite layer 30 having a hole 20, an electrically conductive body (e.g., hole applicator 40 in FIG. 11 or fastener 2 in FIG. 12) disposed inside the hole 20 and electrically connected to the alternating current source 136, a coating 12 made of electrically conductive material disposed between the electrically conductive body and the hole 20, and a sensing pad 38 capacitively coupled to the composite layer 30 and electrically connected to the first terminal 3 of operational amplifier 138. The second input terminal 5 receives alternating current from the alternating current source 136 after it has flowed through the fixed resistance R2 and the capacitor 160. The capacitor 160 has one side electrically connected to the fixed resistance R2 and another side electrically connected to the second terminal 5 of operational amplifier 138.

The output terminal of operational amplifier 140 is electrically connected to the negative input terminal 9 of operational amplifier 140 by way of a capacitor 162 having a capacitance C3 and by way of a resistance R8 in parallel. The resistance R7, operational amplifier 140, capacitor 162, and resistance R8 form an integrator 134. The output terminal of operational amplifier 140 is also electrically connected to a first output terminal 142. A second output terminal 144 is electrically connected to ground by way of junction 166. Thus, the output voltage $V_{out}$ between first and second output terminals 142 and 144 is the output voltage of operational amplifier 140. The operational amplifier 140 performs the mathematical operation of integration with respect to time; that is, the output voltage is proportional to the input voltage integrated over time, as seen in FIG. 14, which shows the output voltage $V_{out}$ versus time as the thickness of the coating 12 being deposited in the hole 20 increases.

Figure 13:
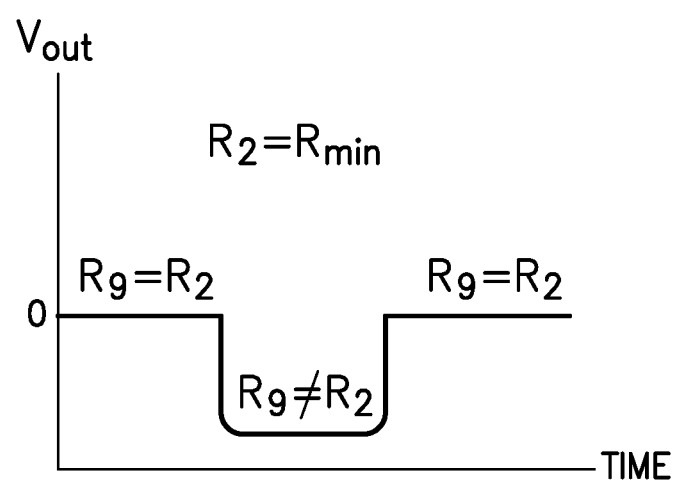
FIG. 13 is a graph of the output voltage $V_{out}$ of the circuitry depicted in FIG. 11 versus time that shows how the output voltage $V_{out}$ varies in dependence on whether the variable resistance R9 is equal to fixed resistance R2 or not.

FIG. 13 is a graph of the output voltage $V_{out}$ of the circuitry depicted in FIG. 11 versus time that shows how the output voltage $V_{out}$ varies in dependence on whether the variable effective resistance R9 is equal to fixed resistance R2 or not. As seen in the graph of FIG. 13 and the upper graph in FIG. 14, the output voltage $V_{out}$ increases suddenly when the value of the effective resistance R9 changes from R9≠R2 to R9=R2.

The effective resistance R9, for all practical purposes, solely depends on the fiber connectivity at the hole interface. This means that the resistance of LMA alone is negligible compared to the resistance of the carbon fibers and, because the current goes through the thin layer of LMA perpendicularly, the resistance becomes practically zero. In other words, the resistance of the interface with the LMA depends on fiber connectivity only and is independent of the LMA application steps.

One benefit of the resistance measuring circuit 36 depicted in FIG. 11 is the capacitive coupling of the sensing pad 38 with the composite layer 30 that allows the resistance to be measured with one contact point only. The resistance measurement can be used to determine when the thickness of a coating 12 being applied by an electrically conductive applicator 40 reaches a desired thickness. As previously mentioned, a resistance R2 is selected that corresponds to the resistance of a coating having the desired thickness. Accordingly, when R9=R2, the coating deposition process can be terminated.

Figure 15:
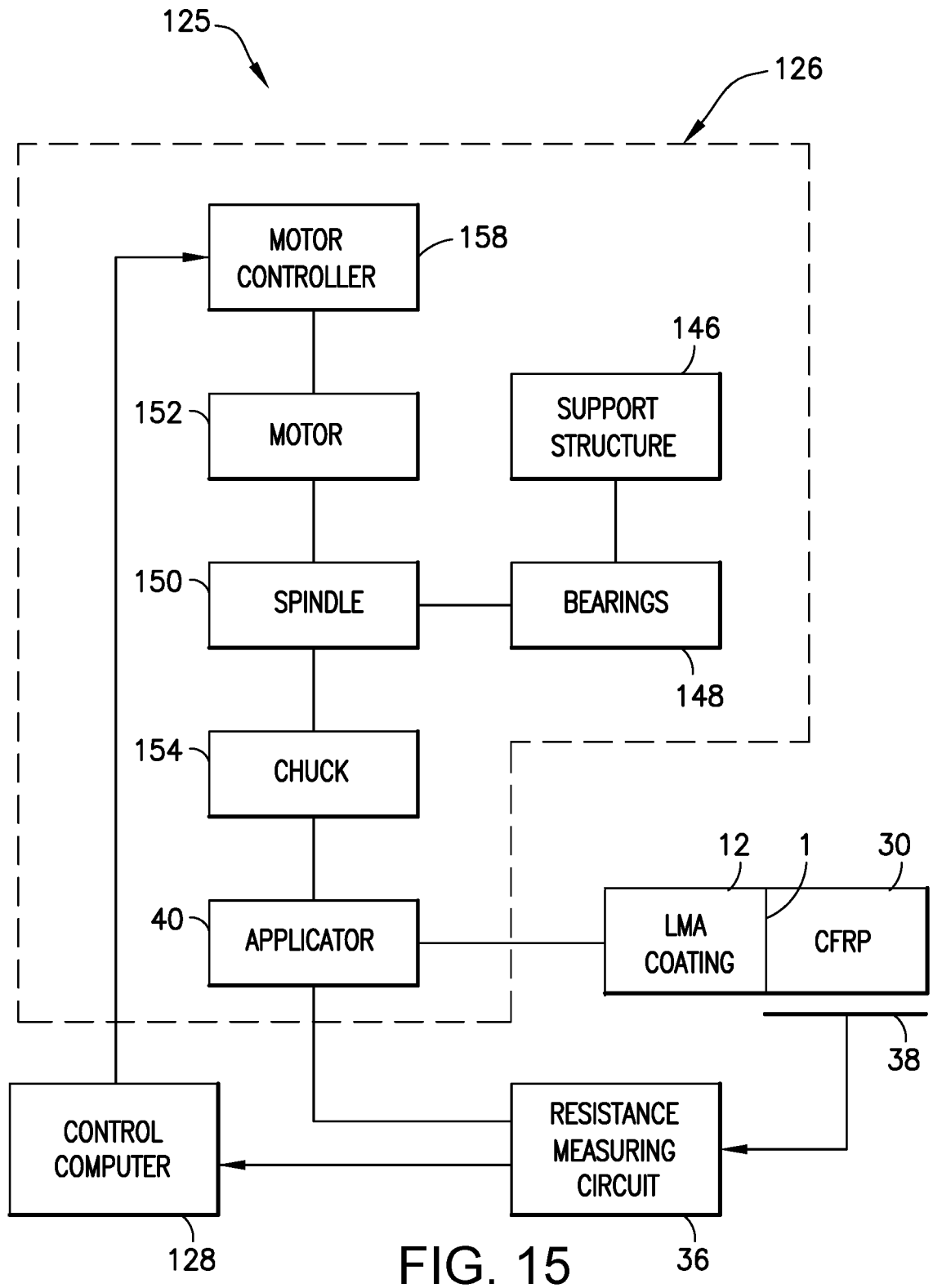
FIG. 15 is a block diagram identifying components of a system for monitoring the thickness of an electrically conductive coating deposited in a joint hole in a composite layer including CFRP by measuring an effective resistance at the hole interface.

FIG. 15 is a block diagram identifying components of a system 125 for monitoring the thickness of a coating 12 made of electrically conductive material deposited on a surface defining a hole 20 in a composite layer 30 including CFRP by measuring an effective resistance at the hole interface 1. The system 125 includes an apparatus 126 that is under the command of a control computer 128. The apparatus 126 includes a support structure 146, bearings 148, a spindle 150, a motor 152, a chuck 154, a hole coating applicator 40; and a low-melting alloy pad (not shown in FIG. 15). The bearings 148 are supported by the support structure 146. The spindle 150 is rotatably supported by the bearings 148. The motor 152 is mechanically coupled to the spindle 150 for driving rotation of the spindle 150. The chuck 154 is coupled to a distal end of the spindle 150. The hole coating applicator 40 includes a shaft (not shown in FIG. 15) made of a material that is not a low-melting alloy and clamped by the chuck 154. The low-melting alloy pad is supported by the shaft and radially movable relative to the shaft. The support structure 146 may take the form of an articulated robot arm (not shown in the drawings).

During rotation of the spindle 150, the applicator 40 applies coating 12 on a surface defining a hole 20 formed in the composite layer 30. A sensing pad 38 is capacitively coupled to the composite layer 30. The resistance measuring circuit 36 (shown in detail in FIG. 11) can be connected to the applicator 40 (which is made of electrically conductive metal alloy) and to the sensing pad 38 (which is made of electrically conductive metal or metal alloy). The output voltage $V_{out}$ from the resistance measuring circuit 36 is received by the control computer 128, which commands the motor controller 158 in dependence on the output voltage level. On the one hand, if the output voltage $V_{out}$ has a level indicating that the effective resistance R9 is not equal to the resistance R2, then the control computer 128 does not send a command to the motor controller 158 instructing the motor controller 158 to turn off the motor 152. On the one hand, if the output voltage $V_{out}$ has a level indicating that the effective resistance R9 is equal to the resistance R2, then the control computer 128 sends a command to the motor controller 158 instructing the motor controller 158 to turn off the motor 152.

Figure 17:
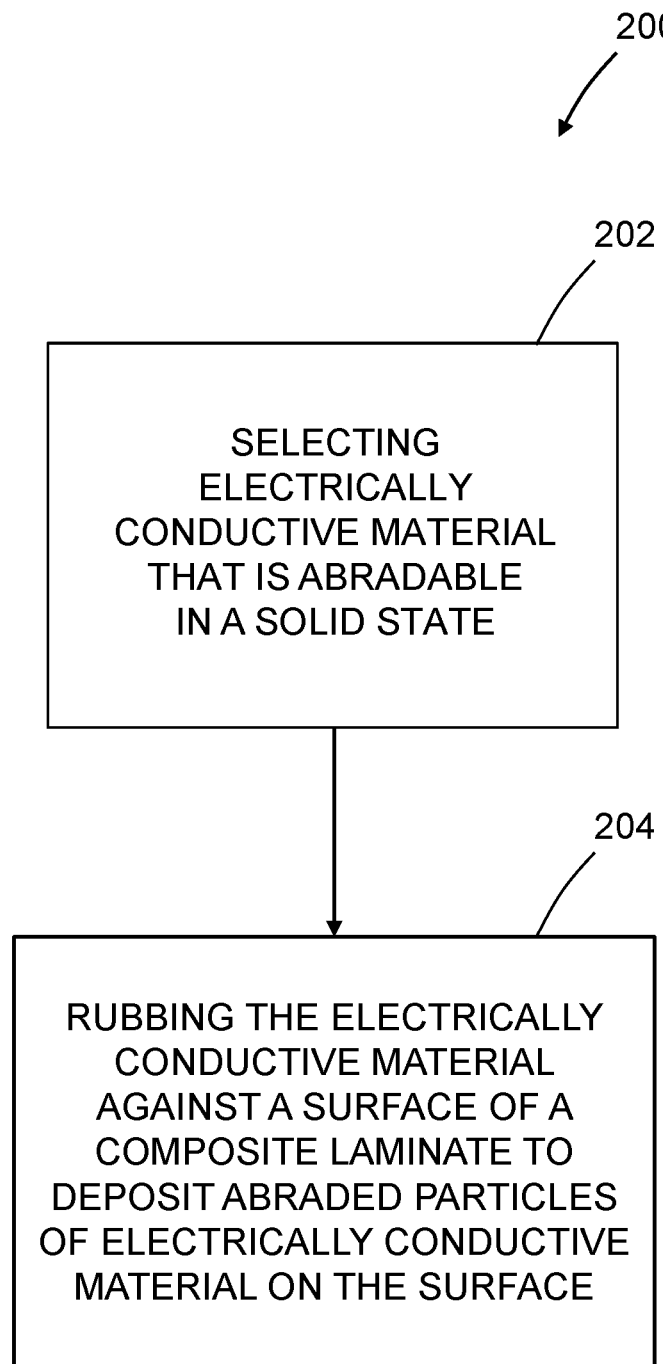
FIG. 17 is a flowchart identifying steps of a method for applying a coating on a surface of a lamination of plies of fiber-reinforced plastic material.

FIG. 17 is a flowchart identifying steps of a method 200 for applying a coating 12 on a surface of a lamination of plies of fiber-reinforced plastic material. The surface (which may define a hole 20 or form an edge 21) of the lamination includes exposed ends of reinforcement fibers. The method 200 includes selecting an electrically conductive material that is abradable in a solid state by rubbing against the surface of the lamination having exposed ends of reinforcement fibers (step 202). The method 200 further includes rubbing the electrically conductive material against the surface of the lamination to cause particles of electrically conductive material to be abraded and deposited on the surface of the lamination (step 204).

Figure 18:
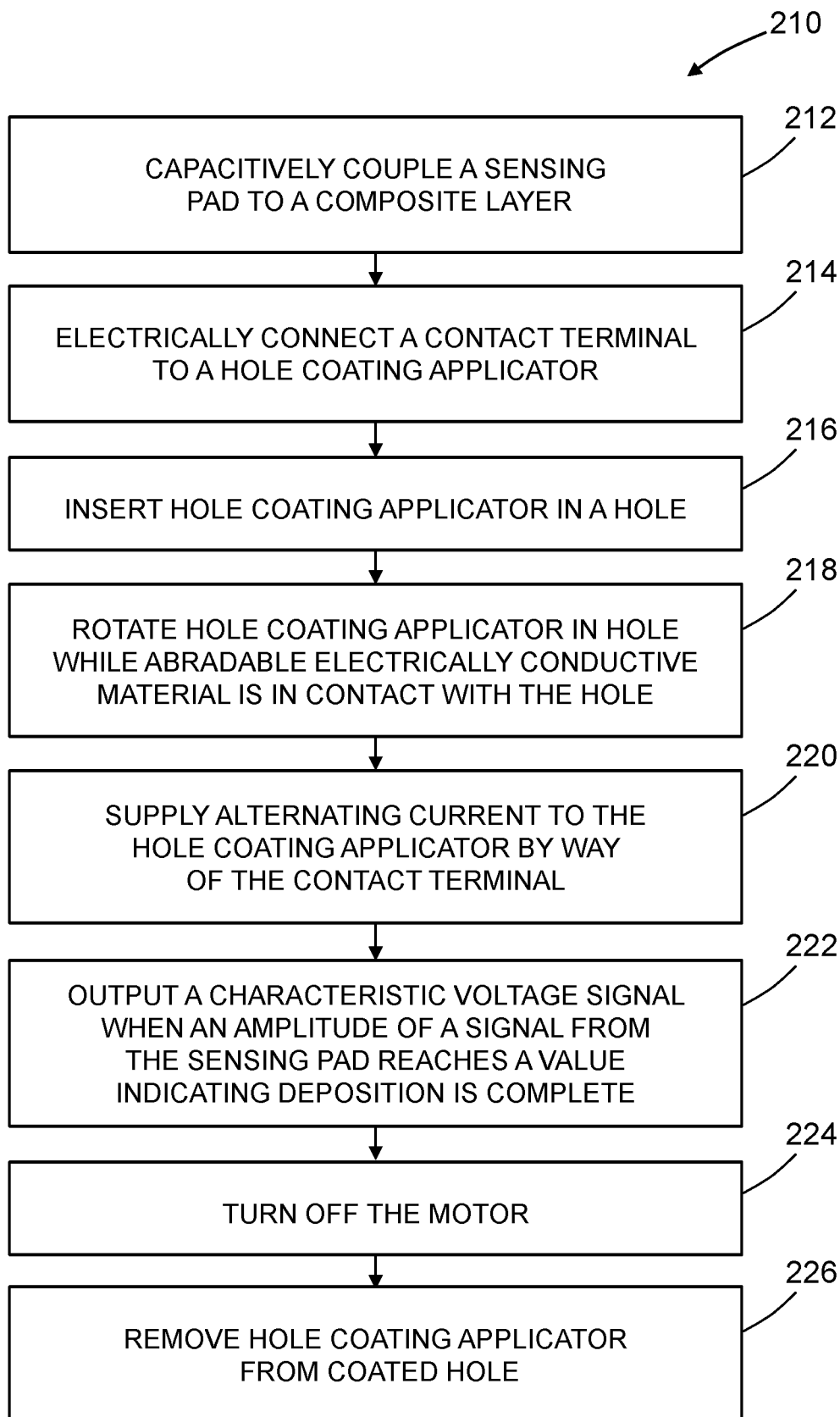
FIG. 18 is a flowchart identifying steps of a method for applying a coating on a surface that defines a hole in a composite layer using the system depicted in FIG. 15.

FIG. 18 is a flowchart identifying steps of a method 210 for applying a coating 12 on a surface defining a hole 20 of a composite layer 30 using the system 125 depicted in FIG. 15. The sensing pad 38 of the resistance measuring circuit 36 is capacitively coupled to the composite layer 30 (step 212). A contact terminal of the resistance measuring circuit 36 is electrically connected to the hole coating applicator 40 (step 214). The hole coating applicator 40 is inserted in the hole 20 (step 216). The hole coating applicator 40 is rotated in the hole 20 while the abradable electrically conductive material is in contact with the hole 20 to cause particles of the electrically conductive material to be abraded and deposited on the surface defining hole 20 (step 218). An alternating current is supplied from the resistance measuring circuit 36 to the hole coating applicator 40 by way of the contact terminal (step 220). While the alternating current is being supplied, the resistance measuring circuit 36 outputs a characteristic voltage signal to the control computer 160 when an amplitude of a signal from the sensing pad 38 reaches a value that is indicative that a desired amount of electrically conductive material has been deposited on the surface defining hole 20 (step 222). In response to receipt of the characteristic voltage signal, the control computer 160 sends a control signal to the motor controller 158 instructing it to turn off the motor 152 (step 224), which causes the hole coating applicator 40 to stop rotating. The hole coating applicator 40 is then removed from the coated hole 22 (step 226).

Figure 19:
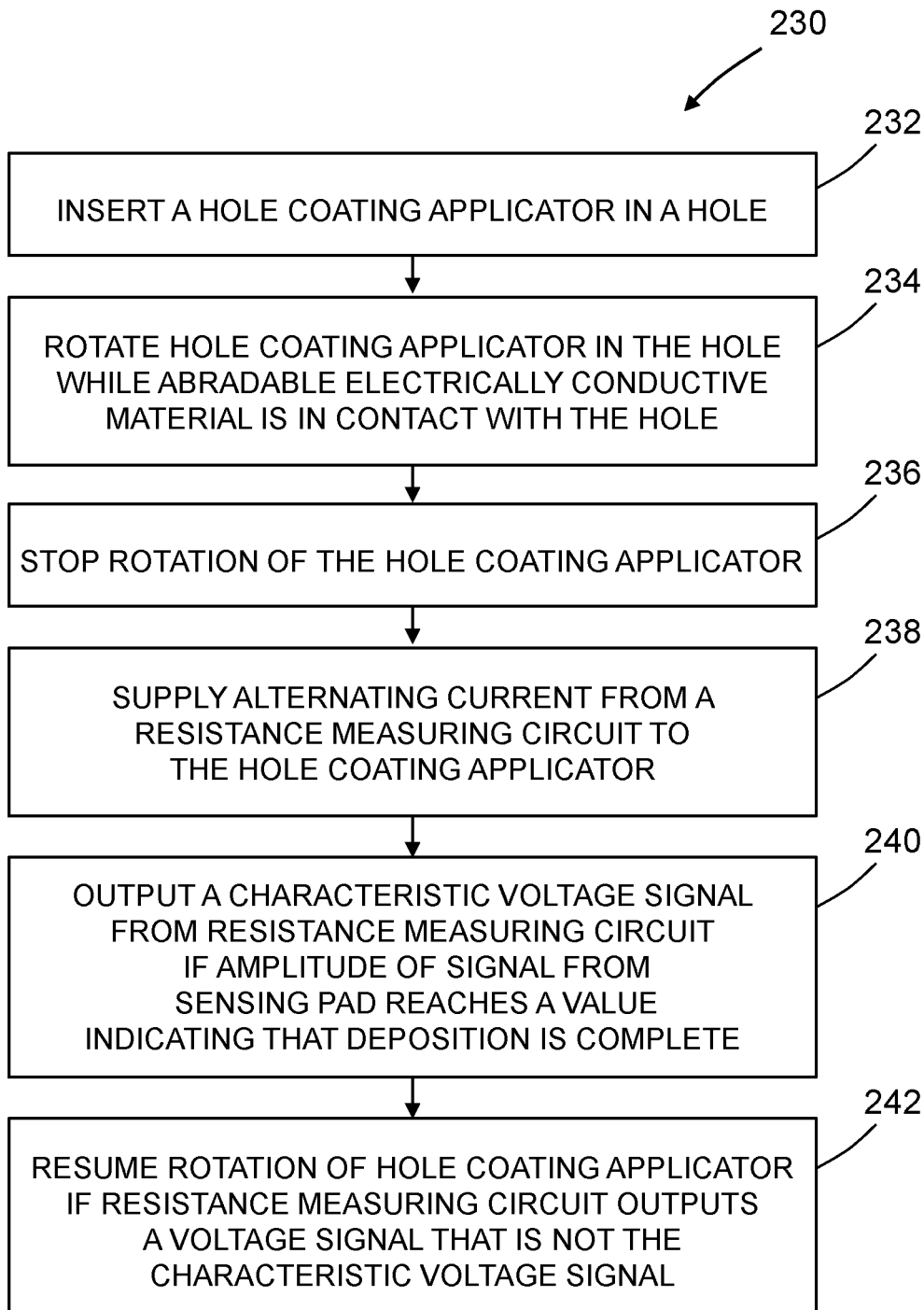
FIG. 19 is a flowchart identifying steps of a method for measuring a contact resistance at an interface of an electrically conductive coating and a cross-ply surface of a composite layer made of fiber-reinforced plastic having electrically conductive fibers.

FIG. 19 is a flowchart identifying steps of a method 230 for measuring a contact resistance at an interface of an electrically conductive coating and a cross-ply surface of a composite layer made of fiber-reinforced plastic having electrically conductive fibers. The hole coating applicator 40 is inserted in the hole 20 (step 232). Then the hole coating applicator 40 is rotated in the hole 20 while the abradable electrically conductive material is in contact with the hole 20 to cause particles of the electrically conductive material to be abraded and deposited on the surface defining hole 20 (step 234). At some point in time, rotation of the hole coating applicator 40 is stopped (step 236). While the hole coating applicator 40 is not rotating, an alternating current is supplied from the resistance measuring circuit 36 to the hole coating applicator 40 (step 238). While the alternating current is being supplied, a characteristic voltage signal is output from the resistance measuring circuit 36 if an amplitude of a signal from the sensing pad 38 reaches a value that is indicative that a desired amount of electrically conductive material has been deposited on the surface defining the hole 20 (step 240). Rotation of the hole coating applicator 40 is resumed if the resistance measuring circuit 36 outputs a voltage signal that is not the characteristic voltage signal (step 242).

Figure 12:
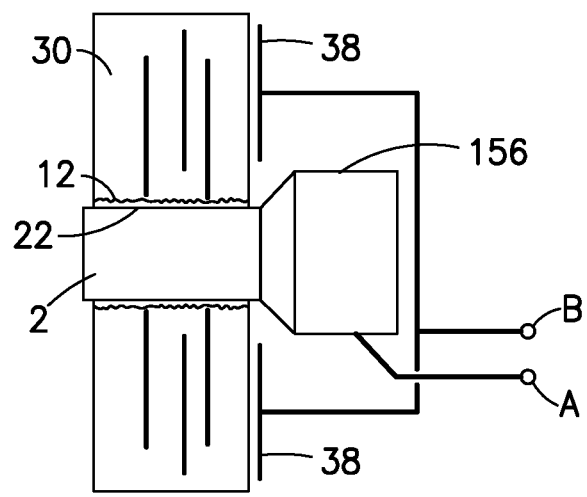
FIG. 12 is a diagram showing the placement of a sensing pad around a coated hole in which a fastener is being inserted for use in measuring the thickness of the electrically conductive coating.

The resistance measurement technology disclosed above can also be used to check the thickness of a coating 12 during the insertion of a fastener 2 into a coated hole 22. FIG. 12 is a diagram showing a sensing pad 38 (only partly shown) placed around a coated hole 22. The sensing pad 38 has the shape of an annular ring and is preferably placed concentric to the hole 20. FIG. 12 shows the fastener 2 being held by the fastener inserter 156 during measurement of the effective resistance R9. The same resistance measuring circuit 36 can be used. In this scenario, terminal A of the resistance measuring circuit 36 is connected to the fastener 2 (which is made of electrically conductive metal alloy) while terminal B is connected to the sensing pad 38. If the resistance measuring circuit 36 outputs a voltage indicating that the effective resistance R9 is at least equal to the selected resistance R2 (representing the desired coating thickness), then the coating thickness is deemed acceptable and installation of the fastener can be completed by coupling a mating part (not shown) to the threaded end of the fastener 2 and then disengaging and retracting the fastener inserter 156.

Figure 16:
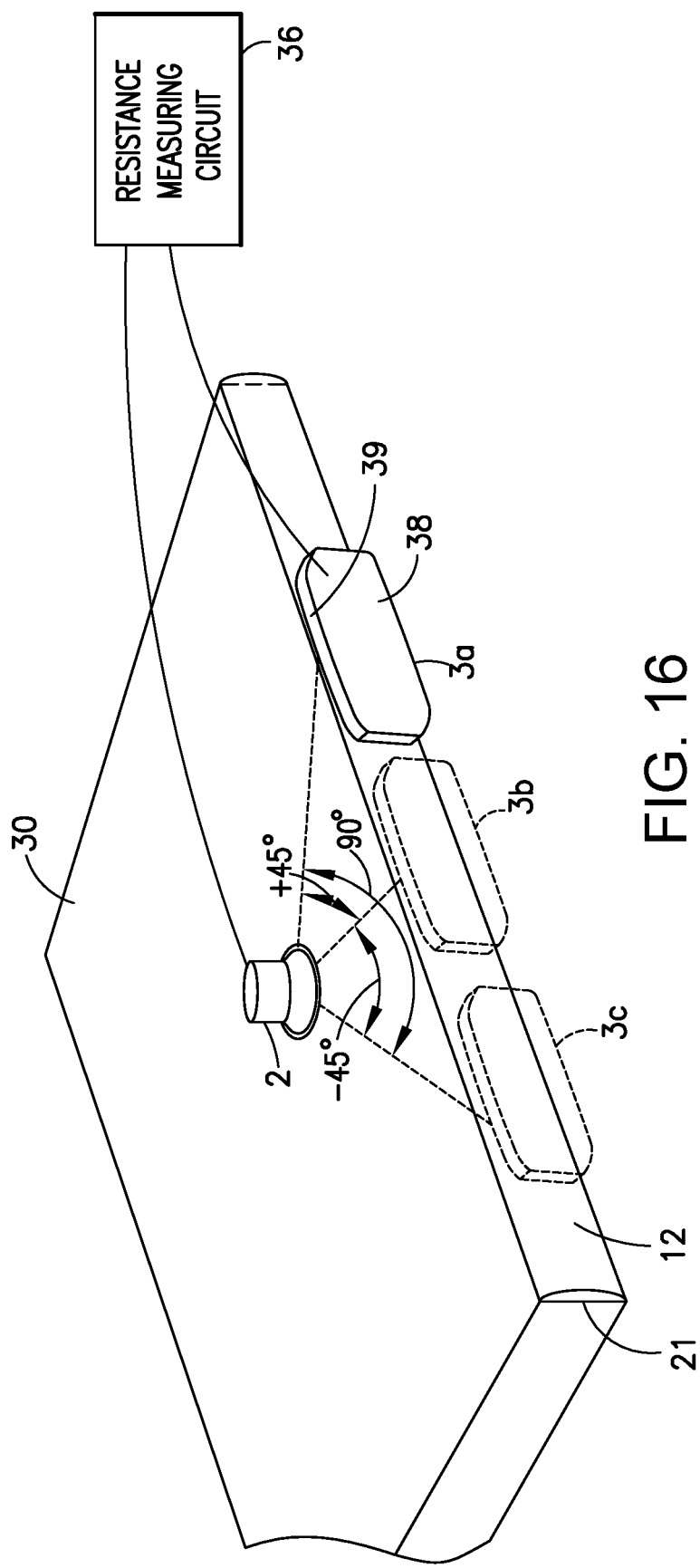
FIG. 16 is a diagram identifying components of a system for monitoring the thickness of an electrically conductive coating deposited on an edge of a composite layer including CFRP by measuring an effective resistance with reference to a near-edge fastener.

As previously mentioned, the resistance measuring circuit 36 depicted in FIG. 11 can also be used to measure the thickness of a coating applied on an edge 21 of a composite layer 30. FIG. 16 is a diagram identifying components of a system for monitoring the thickness of an electrically conductive coating 12 deposited on an edge 21 of a composite layer 30 including CFRP by measuring an effective resistance with reference to a near-edge fastener 2. The composite layer 30 includes a stack of plies, the carbon fibers in each ply being mutually parallel to each other, but different plies having different fiber orientations. In the example depicted in FIG. 16, some plies have fibers oriented at a 90-deg angle, some plies have fibers oriented at a +45-deg angle and some plies have fibers oriented at a −45-deg angle. Thus, any electric spark produced at the fastener 2 could travel from the fastener 2 toward the edge 21 along fibers that are oriented in any of the three directions. Accordingly, it would be of interest to know the thickness of the coating 12 at each of the three preferred locations indicated by the location of the sensing pad 38 seen in FIG. 16 and the two other locations indicated by dashed outlines of the sensing pad.

The sensing pad 38 has a specific surface area (e.g., 1 $cm^2$). By knowing what the target resistance value should be, one can measure the pad resistance for any given area of a planar surface coated with LMA. What this signifies is how complete the contact is between the coating 12 and the CFRP edge 21 at any given region under the sensing pad 38. The applied force on the sensing pad 38 should stay the same (for consistency) throughout the measurements, because the interface contact resistance and capacitance depend on the compression as well.

The term "sensing pad" as used herein refers to the capacitive element over the CFRP surface in FIG. 11 or overlying the coating 12 in FIG. 16. The sensing pad 38 has a dielectric coating 39 to prevent any incidental short circuit. For the hole resistance measurement, a simplest shape is a flat circular plate with a central hole (referred to herein as an "annular ring"). The hole allows the applicator insertion to the CFRP through it. For edge measurement, no hole is necessary and the plate size may vary based on the ply thickness. The effective surface area and the combined dielectric constant are the key variables that determine the effective capacitance. The shape of the two-dimensional contour does not change the capacitance but the shape must be chosen to conform to the geometry of the area under test. The simplest shape for edge measurement would be a rectangular plate with width equal to the ply thickness and a proper length to produce an effective capacitance within the range of the proposed resistance measuring circuit.

As disclosed above, the resistance measuring circuit 36 can be used to measure a contact resistance at an interface of an electrically conductive coating and a cross-ply surface of a composite layer made of fiber-reinforced plastic having electrically conductive fibers. The cross-ply surface may define a hole in or form an edge of the composite layer. In accordance with one embodiment, a sensing pad is placed on a surface of the composite layer, as shown in FIG. 11. In accordance with another embodiment, a sensing pad is placed on a coated edge of the composite layer, as shown in FIG. 16. These embodiments share common steps identified in FIG. 21.

Figure 21:
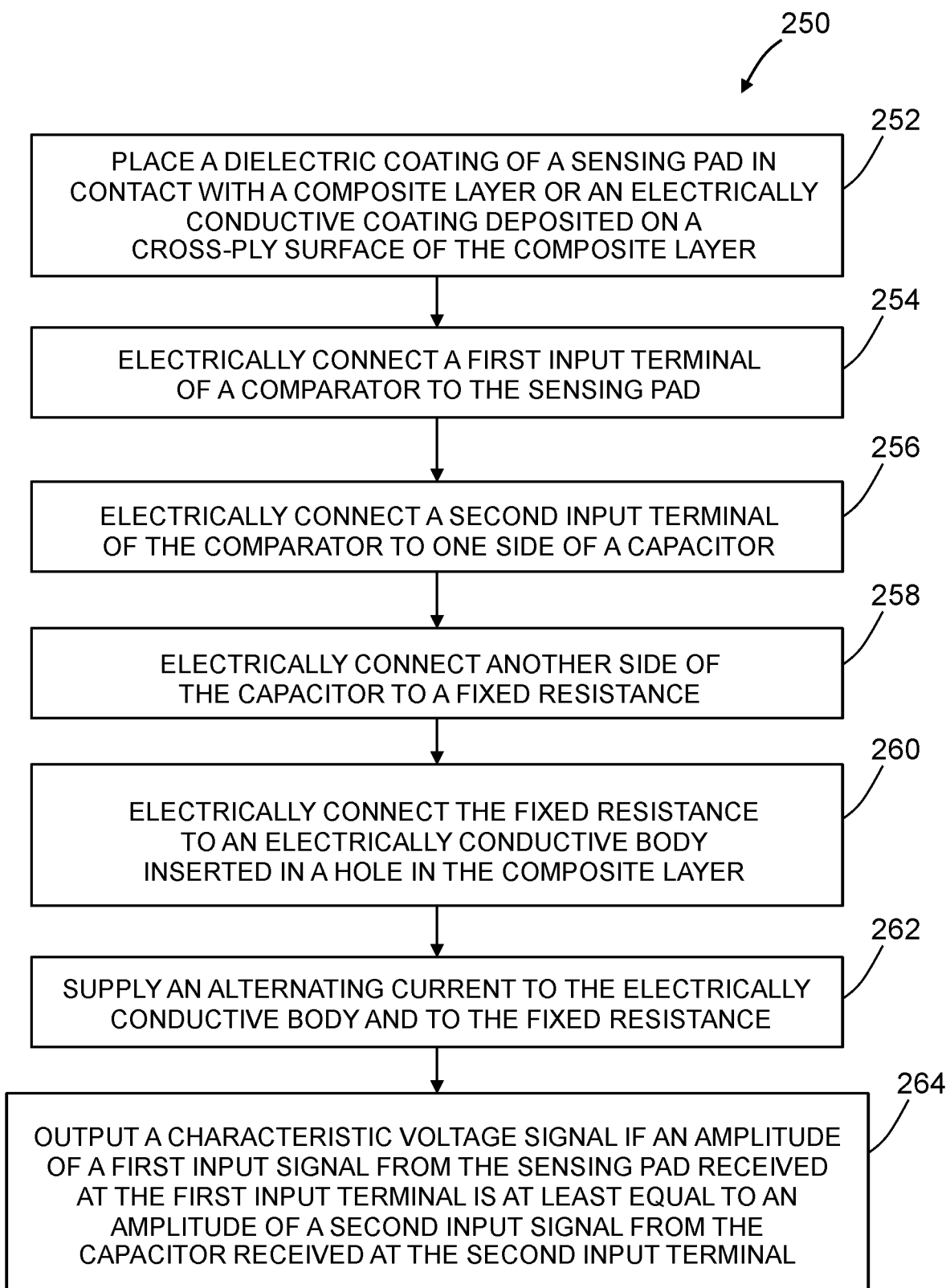
FIG. 21 is a flowchart identifying steps of a method for measuring a contact resistance at an interface of an electrically conductive coating and a cross-ply surface of a composite layer made of fiber-reinforced plastic having electrically conductive fibers.

More specifically, FIG. 21 is a flowchart identifying steps of a method 250 for measuring a contact resistance at an interface of an electrically conductive coating and a cross-ply surface of a composite layer made of fiber-reinforced plastic having electrically conductive fibers. The method 250 includes the following steps. First, a dielectric coating of a sensing pad is placed in contact with the composite layer or with the electrically conductive coating on the cross-ply surface of the composite layer (step 252). Then a first input terminal of a comparator is electrically connected to the sensing pad (step 254) and a second input terminal of the comparator is electrically connected to one side of a capacitor (step 256). Another side of the capacitor is electrically connected to a fixed resistance (step 258). The fixed resistance is electrically connected to an electrically conductive body (e.g., a fastener) inserted in a hole in the composite layer (step 260). To perform the measurement, an alternating current is supplied to the electrically conductive body and to the fixed resistance (step 262). While the alternating current is being supplied, a characteristic voltage signal is output by the comparator if an amplitude of a first input signal from the sensing pad received at the first input terminal of the comparator is at least equal to an amplitude of a second input signal from the capacitor received at the second input terminal of the comparator (step 264). In accordance with one embodiment of the method described in the preceding paragraph, the cross-ply surface of the composite layer defines a hole and the electrically conductive body is a fastener or a hole coating applicator inserted in the hole. In accordance with another embodiment of the method described in the preceding paragraph, the electrically conductive coating is disposed on an edge of the composite layer near the fastener. The method may further include: depositing electrically conductive material on the hole to form the electrically conductive coating until a time when the characteristic voltage signal is output; and ceasing depositing of electrically conductive material on the hole after the characteristic voltage signal is output.

Lastly, the resistance monitoring techniques disclosed herein are not limited in application to determining the thickness of an electrically conductive coating that interfaces with CFRP along cross-ply surfaces. In instances where a certain specific physical parameter can be related (e.g., by an equation) to its electrical resistance, the resistance measuring method disclosed herein could be used to accurately measure that parameter indirectly. For example, if an interface resistance were very sensitive to humidity or temperature, then methods disclosed herein could be used to indirectly measure the parameter of interest accurately through the change in the electrical resistance, which depends on the parameter of interest.

While systems, apparatus, and methods for coating joint holes in a composite layer by abrasion of solid electrically conductive material have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The method claims appended hereto should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

As used in the claims, the term "fixedly coupled to" should be construed broadly to encompass any of the following: integrally formed with, joined to, fastened to, and attached to.

The invention claimed is:

1. A method for applying a coating on a surface of a lamination of plies of fiber-reinforced plastic material, wherein the surface of the lamination includes exposed ends of reinforcement fibers, the method comprising:
selecting an electrically conductive material that is abradable in a solid state by rubbing against the surface of the lamination having exposed ends of reinforcement fibers;
supporting the electrically conductive material by a shaft; and
activating a motor to rotate the shaft while the electrically conductive material contacts the surface of the lamination to cause particles of electrically conductive material to be abraded and deposited on the surface of the lamination.

2. The method as recited in claim 1, wherein the surface of the lamination defines a hole that extends through multiple plies, and the method further comprises inserting the shaft in a space bounded by the surface that defines the hole.

3. The method as recited in claim 2, wherein during rotating the shaft, the electrically conductive material rotates in the space bounded by the surface defining the hole, while the electrically conductive material is in frictional contact with the surface defining the hole, to cause particles of electrically conductive material to be abraded and deposited on the hole around an entire circumference of the hole.

4. The method as recited in claim 3, further comprising attaching the electrically conductive material to a flexural element configured to flex radially outward when the electrically conductive material is rotated.

5. The method as recited in claim 3, wherein the electrically conductive material is urged radially outward by a spring force during rotation.

6. The method as recited in claim 1, wherein the surface of the lamination defines an edge that has been cut through multiple plies.

7. The method as recited in claim 1, wherein selecting an electrically conductive material that is abradable in a solid state comprises selecting a low-melting alloy.

8. An apparatus comprising:
a support structure;
bearings supported by the support structure;
a spindle rotatably supported by the bearings;
a motor mechanically coupled to the spindle for driving rotation of the spindle;
a chuck coupled to the spindle; and
a hole coating applicator comprising a shaft and a low-melting alloy pad, wherein the shaft comprises a material that is not a low-melting alloy and is clamped by the chuck, and the low-melting alloy pad is supported by the shaft and radially movable relative to the shaft.

9. The apparatus as recited in claim 8, wherein the hole coating applicator further comprises a flexural element configured to bend relative to the shaft due to flexure of a flexural hinge, and the low-melting alloy pad is attached to the flexural element.

10. The apparatus as recited in claim 8, wherein the hole coating applicator further comprises:
a camming surface;
a camming block that supports the low-melting alloy pad and has an inclined surface in contact with the camming surface; and
a spring that exerts an axial spring force on the camming block,
wherein the camming surface is configured to deflect the camming block to move radially outward when the axial spring force is exerted on the camming block.

11. A hole coating applicator comprising:
a shaft made of a metal alloy and having a distal end;
an applicator body made of a metal alloy, the applicator body comprising a non-flexural portion that is fixedly coupled to a portion of the shaft located at a distance from the distal end of the shaft and a first flexural element configured to bend relative to the non-flexural portion due to flexure of a first flexural hinge, the first flexural element having an outer peripheral surface; and
a first pad made of abradable material and attached to the first flexural element, the first pad having an outer peripheral surface that is a section of a right circular cylindrical surface extending radially outward further than the outer peripheral surface of the first flexural element.

12. The hole coating applicator as recited in claim 11, wherein the applicator body further comprises a second flexural element that is configured to bend relative to the non-flexural portion due to flexure of a second flexural hinge, and the hole coating applicator further comprises a second pad made of abradable material and attached to the second flexural element.

13. The hole coating applicator as recited in claim 12, wherein the first flexural hinge directly connects the first flexural element to the non-flexural portion, and the second flexural hinge directly connects the second flexural element to the non-flexural portion.

14. The hole coating applicator as recited in claim 12, wherein a distal end of the first flexural element has a circumferential portion of a first truncated right circular conical surface, and a distal end of the second flexural element has a circumferential portion of a second truncated right circular conical surface, and the hole coating applicator further comprises:
a slider slidably coupled to the shaft in a vicinity of distal ends of the first and second flexural elements, the slider has a third truncated right circular conical surface that abuts the circumferential portions of the first and second truncated right circular conical surfaces of the first and second flexural elements when the slider is in an abutting position; and
a spring that applies a spring force on the slider that causes the third truncated right circular conical surface to deflect the ends of the first and second flexural elements away from the shaft.

15. The hole coating applicator as recited in claim 11, wherein the applicator body further comprises a second flexural element configured to bend relative to the non-flexural portion due to flexure of a second flexural hinge, wherein the first flexural element is configured to bend relative to the second flexural element due to flexure of the first flexural hinge and to bend relative to the shaft due to flexure of the first and second flexural hinges.

16. The hole coating applicator as recited in claim 15, wherein the first flexural element is configured to bend relative to the second flexural element and relative to the non-flexural portion due to flexure of a third flexural hinge and a fourth flexural hinge.

17. The hole coating applicator as recited in claim 16, further comprising a third flexural element configured to bend relative to the second flexural element due to flexure of the third and fourth flexural hinges and due to flexure of a fifth flexural hinge and to bend relative to the non-flexural portion due to flexure of the second, third, fourth, and fifth flexural hinges, the third flexural element made of the metal alloy that the shaft is made of, wherein the first flexural element is configured to bend relative to the third flexural element due to flexure of the first flexural hinge, and the third flexural element is configured to bend relative to the first flexural element due to flexure of the fifth flexural hinge.

18. A hole coating applicator comprising:
a shaft made of a material that is not a low-melting alloy;
an applicator body coupled to the shaft, the applicator body made of a material that is not a low-melting alloy and comprising a first camming surface;
a first camming block made of a material that is not a low-melting alloy and having an inclined surface that confronts the first camming surface;
a first low-melting alloy pad attached to the first camming block, the first low-melting alloy pad having an outer peripheral surface that is exposed; and
a spring configured to exert an axial spring force on the first camming block, wherein the first camming surface is configured to deflect the first camming block to move in a direction having a radially outward component when the first camming block is moved by the axial spring force.

19. The hole coating applicator as recited in claim 18, wherein the applicator body further comprises a second camming surface, and the hole coating applicator further comprises:
a second camming block having an inclined surface that confronts the second camming surface; and a second low-melting alloy pad attached to the second camming block, the second low-melting alloy pad having an outer peripheral surface that is exposed, wherein the spring is configured to exert an axial spring force on the second camming block causing the second camming surface to deflect the second camming block to move in a direction having a radially outward component when the second camming block is moved by the axial spring force.

20. A hole coating applicator comprising:

a shaft made of a metal alloy and having a distal end;

an applicator body made of a metal alloy and comprising a non-flexural portion that is fixedly coupled to a distal end of the shaft, a first flexural element configured to bend relative to the non-flexural portion due to flexure of a first flexural hinge that connects the first flexural element to the non-flexural portion, and a second flexural element configured to bend relative to the first flexural element due to flexure at any one of second, third, and fourth flexural hinges that connect the second flexural element to the first flexural element; and a pad made of abradable material and comprising a first portion attached to the second flexural element.

21. The hole coating applicator as recited in claim 20, wherein the applicator body further comprises a third flexural element configured to bend relative to the first flexural element due to flexure at either one of the second and third flexural hinges or at a fifth flexural hinge that connect the third flexural element to the first flexural element and bend relative to the second flexural element at either of the fourth and fifth flexural hinges that connect the third flexural element to the second flexural element, and the pad further comprises a second portion attached to the third flexural element.

* * * * *